US011465768B2

(12) United States Patent
Meidad

(10) Patent No.: US 11,465,768 B2
(45) Date of Patent: Oct. 11, 2022

(54) REFUELING DEVICE

(71) Applicant: ISRAEL AEROSPACE INDUSTRIES LTD., Lod (IL)

(72) Inventor: Ido Meidad, Modiin (IL)

(73) Assignee: ISRAEL AEROSPACE INDUSTRIES LTD., Lod (IL)

(*) Notice: Subject to any disclaimer, the term of this patent is extended or adjusted under 35 U.S.C. 154(b) by 469 days.

(21) Appl. No.: 16/623,487

(22) PCT Filed: Jul. 8, 2018

(86) PCT No.: PCT/IL2018/050742
§ 371 (c)(1),
(2) Date: Dec. 17, 2019

(87) PCT Pub. No.: WO2019/012523
PCT Pub. Date: Jan. 17, 2019

(65) Prior Publication Data
US 2020/0207483 A1    Jul. 2, 2020

(30) Foreign Application Priority Data

Jul. 10, 2017    (IL) .......................................... 253407

(51) Int. Cl.
*B64D 39/06*        (2006.01)
*B64C 39/02*        (2006.01)
(Continued)

(52) U.S. Cl.
CPC ................ *B64D 39/06* (2013.01); *B64C 9/00* (2013.01); *B64C 9/32* (2013.01); *B64C 13/02* (2013.01);
(Continued)

(58) Field of Classification Search
CPC .. B64D 39/06; B64C 9/00; B64C 9/32; B64C 13/02; B64C 39/024; B64C 2009/005; B64C 2201/021; B64C 2201/063
See application file for complete search history.

(56) References Cited

U.S. PATENT DOCUMENTS 2,582,609 A    1/1952  Steele
2,879,017 A    3/1959  Smith
(Continued)

FOREIGN PATENT DOCUMENTS

DE    1188374 B    3/1965
DE    10013751 A1    10/2001
(Continued)

OTHER PUBLICATIONS

"High Resolution Miniaturized Infrared Engine", Opgal.com, http://www.opgal.com/products.php?actions=show&id=51 last accessed Jun. 25, 2012, Nov. 29, 2010, 2 pages.
(Continued)

*Primary Examiner* — Justin M Benedik
(74) *Attorney, Agent, or Firm* — Dorsey & Whitney LLP

(57) ABSTRACT

Computerized system and method of controlling a refueling device including, when the device is in a non-engaged state: receiving a first roll angle of a tanker, determining a first desired roll angle, and providing a command for controlling a roll element, thereby attempting to achieve or maintain a first roll angle that is substantially the same as the roll angle of the tanker. And, when the device is in an engaged state: receiving a second roll angle of the tanker, determining a second desired roll angle, and providing a command related to the desired roll angle for controlling a yaw element, thereby attempting to achieve or maintain a second roll angle that is substantially the same as the roll angle of the tanker, wherein the roll angle of the device during the
(Continued)

engaged state is facilitated due to a degree of freedom between the refueling device body and refueling nozzle.

22 Claims, 13 Drawing Sheets

(51) Int. Cl.
  *B64C 9/00* (2006.01)
  *B64C 13/02* (2006.01)
  *B64C 9/32* (2006.01)
(52) U.S. Cl.
  CPC ...... *B64C 39/024* (2013.01); *B64C 2009/005* (2013.01); *B64C 2201/021* (2013.01); *B64C 2201/063* (2013.01)

(56) References Cited

U.S. PATENT DOCUMENTS

| | | | |
|---|---|---|---|
| 2,941,761 A | 6/1960 | Cox et al. | |
| 2,954,190 A | 9/1960 | Le | |
| 3,038,632 A | 6/1962 | Brown et al. | |
| 3,059,895 A | 10/1962 | Brown | |
| 3,091,419 A | 5/1963 | Mosher | |
| 3,144,954 A | 8/1964 | Brown et al. | |
| 3,391,817 A | 7/1968 | Francis | |
| 3,547,402 A | 12/1970 | Millar | |
| 3,587,618 A | 6/1971 | Kenyon | |
| 3,691,730 A | 9/1972 | Hickey et al. | |
| 3,693,915 A | 9/1972 | Ulanovsky | |
| 3,710,549 A | 1/1973 | Nichols et al. | |
| 3,747,873 A | 7/1973 | Layer et al. | |
| 3,788,040 A | 1/1974 | Bragg et al. | |
| 3,830,307 A | 8/1974 | Bragg et al. | |
| 3,948,626 A | 4/1976 | Bragg | |
| 3,954,123 A | 5/1976 | Duckworth, Jr. | |
| 4,014,481 A | 3/1977 | Daikeler et al. | |
| 4,072,283 A | 2/1978 | Weiland | |
| 4,098,427 A | 7/1978 | Duckworth, Jr. | |
| 4,126,162 A | 11/1978 | Clark et al. | |
| 4,129,270 A | 12/1978 | Robinson et al. | |
| 4,157,976 A | 6/1979 | Jones et al. | |
| 4,189,059 A | 2/1980 | Shaw | |
| 4,228,246 A | 10/1980 | Taub et al. | |
| 4,231,536 A | 11/1980 | Ishimitsu et al. | |
| 4,282,909 A | 8/1981 | Clark et al. | |
| 4,294,203 A | 10/1981 | Jones | |
| 4,295,617 A | 10/1981 | Oswell et al. | |
| 4,366,669 A | 1/1983 | Jones | |
| 4,377,243 A | 3/1983 | Shaw et al. | |
| D274,548 S | 7/1984 | Shaw | |
| 4,467,937 A | 8/1984 | Shaw | |
| D275,512 S | 9/1984 | Shaw | |
| D275,984 S | 10/1984 | Shaw | |
| 4,586,683 A | 5/1986 | Kerker | |
| 4,607,313 A | 8/1986 | Shaw et al. | |
| 4,806,167 A | 2/1989 | Raythatha | |
| 4,830,673 A | 5/1989 | Jones et al. | |
| 4,879,856 A | 11/1989 | Jones et al. | |
| 5,167,340 A | 12/1992 | Shaw | |
| 5,246,131 A | 9/1993 | Shaw et al. | |
| 5,258,931 A | 11/1993 | Hassler, Jr. | |
| 5,326,052 A | 7/1994 | Krispin et al. | |
| 5,499,784 A | 3/1996 | Crabere et al. | |
| 5,541,405 A | 7/1996 | Hassler, Jr. et al. | |
| 5,781,151 A | 7/1998 | Stratton | |
| 5,785,276 A | 7/1998 | Ruzicka | |
| 5,906,336 A | 5/1999 | Eckstein | |
| 6,141,546 A | 10/2000 | Thomas et al. | |
| 6,192,245 B1 | 2/2001 | Jones et al. | |
| D439,876 S | 4/2001 | Simonov et al. | |
| 6,348,087 B1 | 2/2002 | Aslin | |
| 6,604,711 B1 | 8/2003 | Stevens et al. | |
| 6,644,594 B1 * | 11/2003 | Hunn | B64D 39/06 244/135 R |
| 6,729,359 B2 | 5/2004 | Jones | |
| 6,739,359 B2 | 5/2004 | Jones et al. | |
| 6,819,982 B2 | 11/2004 | Doane | |
| 6,824,105 B2 | 11/2004 | Edwards | |
| 6,966,525 B1 | 11/2005 | Schroeder | |
| 6,994,294 B2 | 2/2006 | Saggio et al. | |
| 6,997,013 B2 | 2/2006 | Jones | |
| 6,997,434 B2 | 2/2006 | Scott | |
| 7,007,894 B1 | 3/2006 | Takacs et al. | |
| 7,013,905 B2 | 3/2006 | Jones et al. | |
| 7,021,586 B2 | 4/2006 | Bolling | |
| 7,028,947 B2 | 4/2006 | Burns | |
| 7,048,231 B2 | 5/2006 | Jones | |
| 7,082,906 B2 | 8/2006 | Jones et al. | |
| 7,097,139 B2 | 8/2006 | Schroeder | |
| 7,137,597 B2 | 11/2006 | Schuster et al. | |
| 7,137,598 B2 | 11/2006 | Von | |
| 7,172,156 B1 | 2/2007 | Jones | |
| 7,172,157 B2 | 2/2007 | Jones | |
| 7,185,854 B2 | 3/2007 | Von et al. | |
| 7,198,229 B2 | 4/2007 | Schroeder | |
| 7,219,510 B2 | 5/2007 | Jones | |
| 7,246,774 B2 | 7/2007 | Von et al. | |
| 7,275,718 B2 | 10/2007 | Saggio, III et al. | |
| 7,281,687 B2 | 10/2007 | Schroeder | |
| 7,464,736 B2 | 12/2008 | Jones et al. | |
| 7,481,237 B2 | 1/2009 | Jones et al. | |
| 7,516,920 B2 | 4/2009 | Schroeder | |
| 7,562,847 B2 | 7/2009 | Jones | |
| 7,798,449 B2 | 9/2010 | Small et al. | |
| 8,056,860 B2 | 11/2011 | Small et al. | |
| 8,817,981 B2 | 8/2014 | Fiske | |
| 8,821,657 B2 | 9/2014 | Matschullat | |
| 8,822,750 B2 | 9/2014 | Costa et al. | |
| 9,150,311 B2 * | 10/2015 | Rix | B64D 39/04 |
| 9,457,912 B2 | 10/2016 | Rix | |
| 9,573,696 B2 | 2/2017 | Rix | |
| 2003/0136874 A1 | 7/2003 | Gjerdrum | |
| 2004/0102876 A1 | 5/2004 | Doane | |
| 2005/0166983 A1 | 8/2005 | Shaw et al. | |
| 2005/0224657 A1 | 10/2005 | Bolling | |
| 2005/0284424 A1 | 12/2005 | Jones et al. | |
| 2006/0000949 A1 | 1/2006 | Schroeder | |
| 2006/0043241 A1 | 3/2006 | Schuster et al. | |
| 2006/0060709 A1 | 3/2006 | Thal | |
| 2006/0060710 A1 | 3/2006 | Takacs et al. | |
| 2006/0065785 A1 | 3/2006 | Enig et al. | |
| 2006/0106203 A1 | 5/2006 | Winter et al. | |
| 2006/0292018 A1 | 12/2006 | Jones | |
| 2007/0023570 A1 | 2/2007 | Bernard | |
| 2007/0084968 A1 * | 4/2007 | Thal | B64D 39/00 244/135 A |
| 2007/0108339 A1 | 5/2007 | Plotkin | |
| 2008/0234884 A1 | 9/2008 | Von | |
| 2010/0001124 A1 * | 1/2010 | Feldmann | B64D 39/04 244/58 |
| 2010/0025536 A1 * | 2/2010 | Schroeder | B64D 39/06 244/135 A |
| 2010/0321011 A1 | 12/2010 | Small et al. | |
| 2011/0180666 A1 | 7/2011 | Speer et al. | |
| 2018/0265212 A1 * | 9/2018 | Pruzan | B64D 39/06 |

FOREIGN PATENT DOCUMENTS

| | | |
|---|---|---|
| EP | 2045186 A1 | 4/2009 |
| EP | 2915751 A1 | 9/2015 |
| EP | 3040280 A1 | 7/2016 |
| GB | 781059 A | 8/1957 |
| GB | 1085040 A | 9/1967 |
| GB | 2237251 A | 5/1991 |
| GB | 2303418 A | 2/1997 |
| GB | 2304498 A | 3/1997 |
| GB | 2313740 A | 12/1997 |
| GB | 2318252 A | 4/1998 |
| GB | 2320646 A | 6/1998 |
| GB | 2347068 A | 8/2000 |
| GB | 2364207 A | 1/2002 |

(56) References Cited

FOREIGN PATENT DOCUMENTS

| WO | 9001199 A1 | 2/1990 |
|---|---|---|
| WO | 2013102903 A2 | 7/2013 |
| WO | 2013102906 A2 | 7/2013 |

OTHER PUBLICATIONS

"Miniature 3D Time-of-Flight Range Camera", Mesa-Imaging.ch, http://www.mesa-imaging.ch/prodview4k.php last accessed Jun. 27, 2012, Nov. 29, 2010, 1 page.

"Miricle High Resolution Miniature Infrared Thermal Imagers", Thermoteknix.com, http://www.thermoteknix.com/brochures/miricle/high_resolution_miniature_infrared_thermal_imagers/miricle_lo_res.pdf, Nov. 29, 2010, 3 pages.

"Photon HRC Camera Core", Flir.com, http://www.flir.com/uploadedFiles/PhotonHRC.pdf, Nov. 29, 2010, 2 pages.

"PMD Vision CamCube 3.0", PMDtec.com, http://www.pmdtec.com/products-services/pmdvisionr-cameras/pmdvisionr-camcube-30/ last accessed Jun. 25, 2012, Jun. 15, 2009, 2 pages.

Klass, "Towed Decoys, Flares Displayed", Electronic Warfare, Dec. 5, 2017, 1 page.

International Search Report and Written Opinion from International Application No. PCT/IL2018/050742 dated Oct. 11, 2018.

\* cited by examiner

REFUELING DEVICE

TECHNICAL FIELD

The presently disclosed subject matter relates to systems and methods for refueling an aircraft during flight.

BACKGROUND

Airborne refueling, also known as air refueling or in-flight refueling, refers to the process of transferring fuel from a tanker aircraft to a receiver aircraft during flight.

Two types of airborne refueling systems are:
the hose and drogue system;
the boom and receptacle or "flying boom" system.

In the hose and drogue system, the tanker aircraft is provided with one or more non-rigid refueling lines, at the end of each of which there is a drogue which functions as a stabilizer and includes a receptacle, while the receiver aircraft is fitted with a probe that is configured for engaging with the receptacle. In use, the drogue is not actively controlled, but rather aligns itself freely in the airflow aft of the tanker aircraft. The pilot of the receiver aircraft controls the flight path thereof to ensure engaging contact between the probe and the receptacle. Thereafter, the receiver aircraft is refueled via the refueling line and probe.

In the boom and receptacle system, the tanker aircraft includes a flying boom which is a rigid tube that telescopes outwardly and is gimbaled to the rear of the tanker aircraft, and is otherwise retracted into the tanker fuselage when not in use. The boom carries a fuel line and includes a fuel transfer nozzle at the end thereof. Once the tanker aircraft and receiver aircraft are in close proximity and flying in formation, a dedicated operator in the tanker aircraft controls the position of the boom and inserts the end of the boom including the nozzle into a receptacle provided on an upper part of the receiver aircraft, ensuring proper mating between the nozzle and receptacle, after which fuel transfer can begin.

In addition, there are some tanker aircraft that include a flying boom system and at least one hose and drogue system as well, and are commonly known as Multi-Point Refueling Systems (MPRS). In some cases a hose and drogue system is provided at the tail of the tanker aircraft, and thus only this system or the flying boom system can be used at any one time. In other cases, two under-wing hose and drogue pods, known as Wing Air Refueling Pods (WARPs), can be provided, one under each wing, in addition to the flying boom system.

GENERAL DESCRIPTION

According to one aspect of the presently disclosed subject matter there is provided a computerized method of controlling a refueling device, including:

(a) providing the refueling device that is attached by means of a non-rigid hose to a tanker aircraft; the refueling device having a refueling device body connected to a refueling nozzle by a joint, the joint facilitating at least a degree of freedom of the refueling device body relative to the refueling nozzle when the refueling nozzle is engaged with a receptacle of a receiver aircraft, constituting an engaged state;

(b) repeatedly performing by a controller:
in an instance which the refueling device is not engaged with the receiver aircraft, constituting a non-engaged state:

(b1) receiving a first roll angle of the tanker aircraft from the tanker aircraft;

(b2) determining a first desired roll angle of the refueling device based on the first roll angle of the tanker aircraft; and (b3) providing a first one or more commands related to the first desired roll angle of the refueling device for controlling one or more roll elements of the refueling device thereby attempting to achieve or maintain a first roll angle of the refueling device that is substantially the same as the first roll angle of the tanker aircraft; and in an instance which the refueling device is engaged with the receiver aircraft in the engaged state:

(b4) receiving a second roll angle of the tanker aircraft from the tanker aircraft;

(b5) determining a second desired roll angle of the refueling device based on the second roll angle of the tanker aircraft; and (b6) providing a second one or more commands related to the second desired roll angle of the refueling device for controlling one or more yaw elements of the refueling device thereby attempting to achieve or maintain a second roll angle of the refueling device that is substantially the same as the second roll angle of the tanker aircraft; wherein the second roll angle of the refueling device during the engaged state is facilitated at least due to the degree of freedom between the refueling device body and the refueling nozzle.

In addition to the above features, the method according to this aspect of the presently disclosed subject matter can include one or more of features (i) to (xiii) listed below, in any desired combination or permutation which is technically possible:

(i). wherein stage (b3) further includes: providing a first one or more commands related to the first desired roll angle of the refueling device for controlling the one or more yaw elements of the refueling device; and wherein stage (b6) further includes: providing a second one or more commands related to the second desired roll angle of the refueling device for controlling the one or more roll elements of the refueling device; thereby providing one or more commands to both the one or more roll elements and the one or more yaw elements seamlessly, irrespective of whether the refueling device is in the non-engaged state or the engaged state.

(ii). performing gain calibration to affect the first one or more commands and/or the second one or more commands provided to the one or more roll elements and/or the one or more yaw elements and thereby modify the effect that the one or more roll elements and/or the one or more yaw elements has when attempting to achieve the first and/or second desired roll angle.

(iii). wherein stage (b2) further includes: receiving a first roll angle of the refueling device and determining a first difference between the first desired roll angle and the first roll angle of the refueling device and utilizing the first difference for providing the first one or more commands; and wherein stage (b5) further includes: receiving a second roll angle of the refueling device and determining a second difference between the second desired roll angle and the second roll angle of the refueling device and utilizing the second difference for providing the second one or more commands.

(iv). controlling the one or more roll elements and/or the one or more yaw elements based on the first and/or second one or more commands to attempt to achieve or maintain a roll angle of the refueling device that is substantially the same as the roll angle of the tanker aircraft.

(v). wherein stage (b2) and/or stage (b5) further includes: obtaining a relative position of the tanker aircraft and the refueling device; obtaining a speed of the tanker aircraft; and determining a side speed of the refueling device relative to the tanker based on the relative position of the tanker aircraft and the refueling device and the speed of the tanker aircraft; wherein the side speed of the refueling device relative to the tanker is used to prevent or reduce oscillation of the refueling device and thereby help to achieve or maintain a roll angle of the refueling device that is substantially the same as the roll angle of the tanker aircraft.

(vi). wherein stage (b2) and/or stage (b5) further includes obtaining a roll rate of the refueling device; wherein the roll rate is used to prevent or reduce oscillation of the refueling device and thereby help to achieve or maintain a roll angle of the refueling device that is substantially the same as the roll angle of the tanker aircraft.

(vii). wherein the refueling device is an unmanned aerial vehicle (UAV).

(viii). wherein the tanker aircraft is a UAV.

(ix). wherein the receiver aircraft is a UAV.

(x). wherein the joint is a spherical shaped joint.

(xi). wherein the controller is a Proportional Integral (PI) controller.

(xii). wherein the one or more roll elements are one or more ailerons.

(xiii). wherein the wherein the one or more yaw elements are one or more rudders.

According to another aspect of the presently disclosed subject matter there is provided a non-transitory program storage device readable by machine, tangibly embodying a program of instructions executable by the machine to perform the above method of controlling a refueling device.

This aspect of the disclosed subject matter can optionally include one or more of features (i) to (xiii) listed above, mutatis mutandis, in any desired combination or permutation which is technically possible.

According to another aspect of the presently disclosed subject matter there is provided an inflight refueling system, including:

a refueling device that is attached by means of a non-rigid hose to a tanker aircraft; the refueling device having a refueling device body connected to a refueling nozzle by a joint, the joint facilitating at least a degree of freedom of the refueling device body relative to the refueling nozzle when the refueling nozzle is engaged with a receptacle of a receiver aircraft, constituting an engaged state;

a sensor configured to determine a roll angle of the tanker aircraft; and a controller configured to repeatedly perform the following:

when the refueling device is not engaged with the receiver aircraft, constituting a non-engaged state:
(1) receive a first roll angle of the tanker aircraft from the tanker aircraft;
(2) determine a first desired roll angle of the refueling device based on the first roll angle of the tanker aircraft; and
(3) provide a first one or more commands related to the first desired roll angle of the refueling device to control one or more roll elements of the refueling device to thereby attempt to achieve or maintain a first roll angle of the refueling device that is substantially the same as the first roll angle of the tanker aircraft; and when the refueling device is engaged with the receiver aircraft in the engaged state:
(4) receive a second roll angle of the tanker aircraft from the tanker aircraft;
(5) determine a second desired roll angle of the refueling device based on the second roll angle of the tanker aircraft; and
(6) provide a second one or more commands related to the second desired roll angle of the refueling device to control one or more yaw elements of the refueling device to thereby attempt to achieve or maintain a second roll angle of the refueling device that is substantially the same as the second roll angle of the tanker aircraft; wherein the second roll angle of the refueling device during the engaged state is facilitated at least due to the degree of freedom between the refueling device body and the refueling nozzle.

This aspect of the disclosed subject matter can optionally include one or more of features (i) to (xiii) listed above, mutatis mutandis, in any desired combination or permutation which is technically possible.

BRIEF DESCRIPTION OF THE DRAWINGS

In order to better understand the subject matter that is disclosed herein and to exemplify how it can be carried out in practice, examples will now be described, by way of non-limiting example only, with reference to the accompanying drawings, in which.

DETAILED DESCRIPTION

Figure 1:
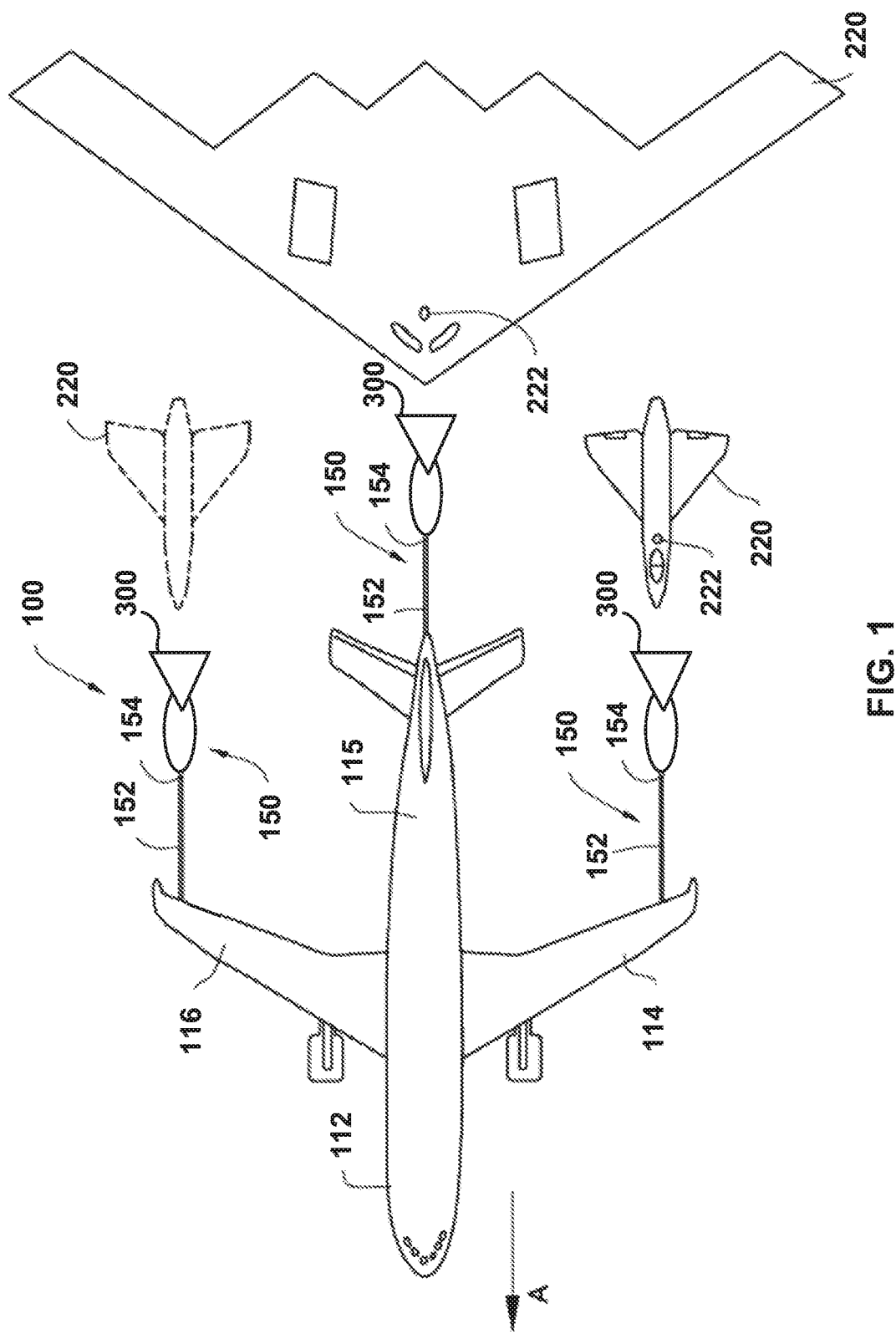
FIGS. 1 and 2 illustrate a tanker system with multiple refueling devices for refueling aircraft during flight, in accordance with certain examples of the presently disclosed subject matter.

In the following detailed description, numerous specific details are set forth in order to provide a thorough understanding of the invention. However, it will be understood by those skilled in the art that the presently disclosed subject matter can be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as, "providing", "performing", "receiving", "determining", "controlling", "obtaining", "calculating", "generating", or the like, refer to the action(s) and/or process(es) of a controller that manipulate and/or transform data into other data, the data represented as physical, such as electronic, quantities, and/or, the data representing the physical objects. The term "controller" should be expansively construed to cover any kind of hardware-based electronic device with data processing capabilities, for example, a computer, etc., and including, by way of non-limiting example, controller 400 including processing circuitry 500 (further detailed herein with regard to FIG. 5) and/or processing circuitry 600 (further detailed herein with regard to FIG. 6), according to some examples disclosed in the present application.

The operations in accordance with the teachings herein can be performed by a computer specially constructed for the desired purposes or by a general-purpose computer specially configured for the desired purpose by a computer program stored in a non-transitory computer-readable storage medium.

Examples of the presently disclosed subject matter are not described with reference to any particular programming language. It will be appreciated that a variety of programming languages can be used to implement the teachings of the presently disclosed subject matter as described herein.

The term. "substantially", used herein includes variations that are equivalent for an intended purpose or function.

As will be further detailed with reference to FIG. 5, controller 400 can be configured to execute several functional modules in accordance with computer-readable instructions implemented on a non-transitory computer-readable storage medium. Such functional modules are referred to hereinafter as included in controller 400.

It is noted that the teachings of the presently disclosed subject matter are not to bound by the structure described with reference to FIGS. 1 to 13. Equivalent and/or modified structure can be consolidated or divided in another manner and can be implemented in any appropriate combination of software with firmware and/or hardware and executed on suitable device(s). For example, one or more elements described as being located on the refueling device can be located on the tanker aircraft and vice versa. As another example, the functionality of one or more of the modules described in FIG. 5 can be consolidated or divided such that a single module takes the place of multiple modules and vice versa.

Figure 7:
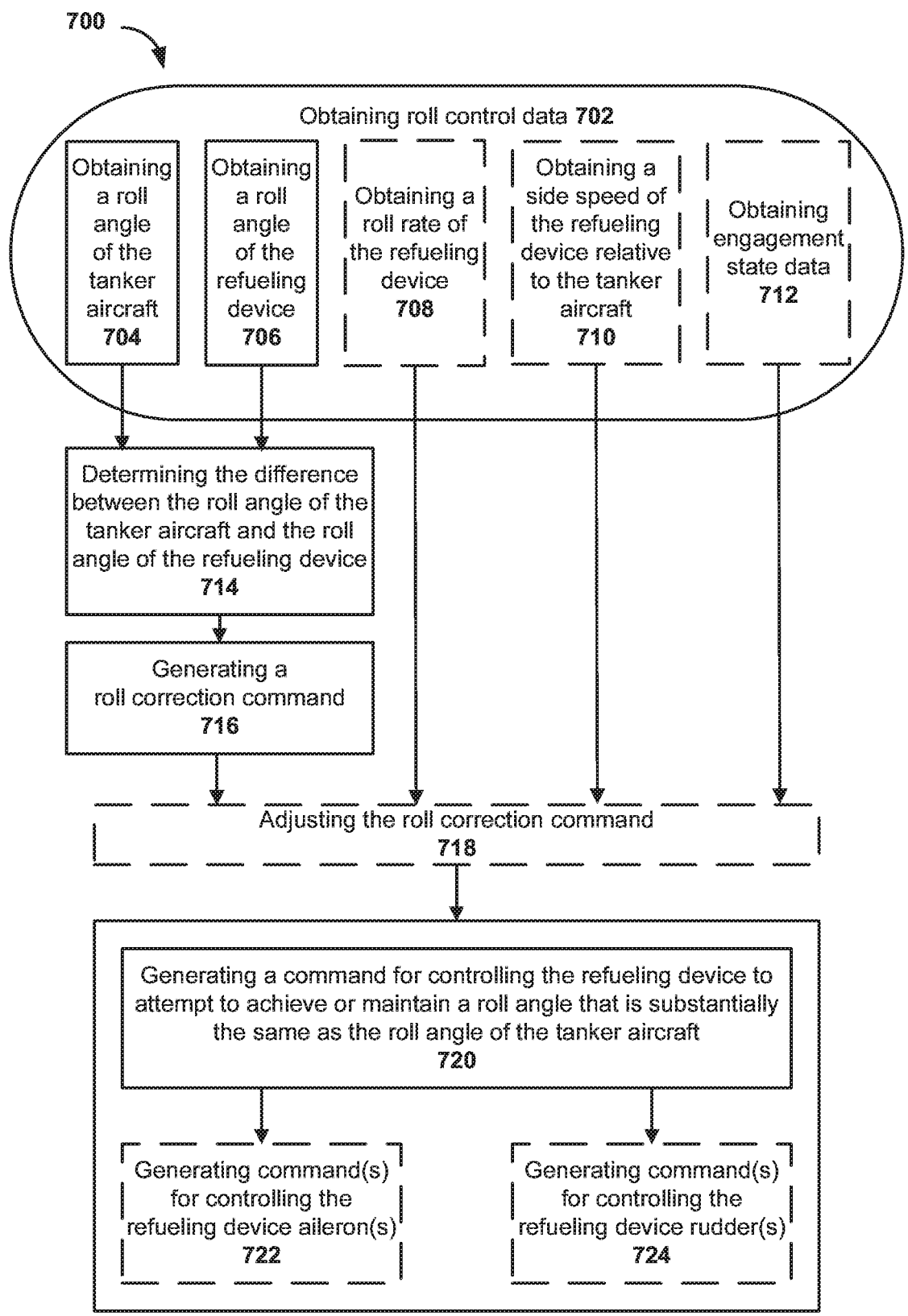
FIG. 7 illustrates a flow chart of a method for controlling a refueling device, in accordance with certain examples of the presently disclosed subject matter.

It is also noted that the teachings of the presently disclosed subject matter are not bound by the flow chart illustrated in FIG. 7; the illustrated operations can occur out of the illustrated order. For example, (block 704) to (block 712) which are shown as being executed substantially concurrently can be executed in succession. It is also noted that whilst the flow chart in FIG. 7 is described with reference to elements of controller 400, e.g., including processing circuitry 500 and/or processing circuitry 600, this is by no means binding, and the operations can be performed by elements other than those described herein.

Figure 2:
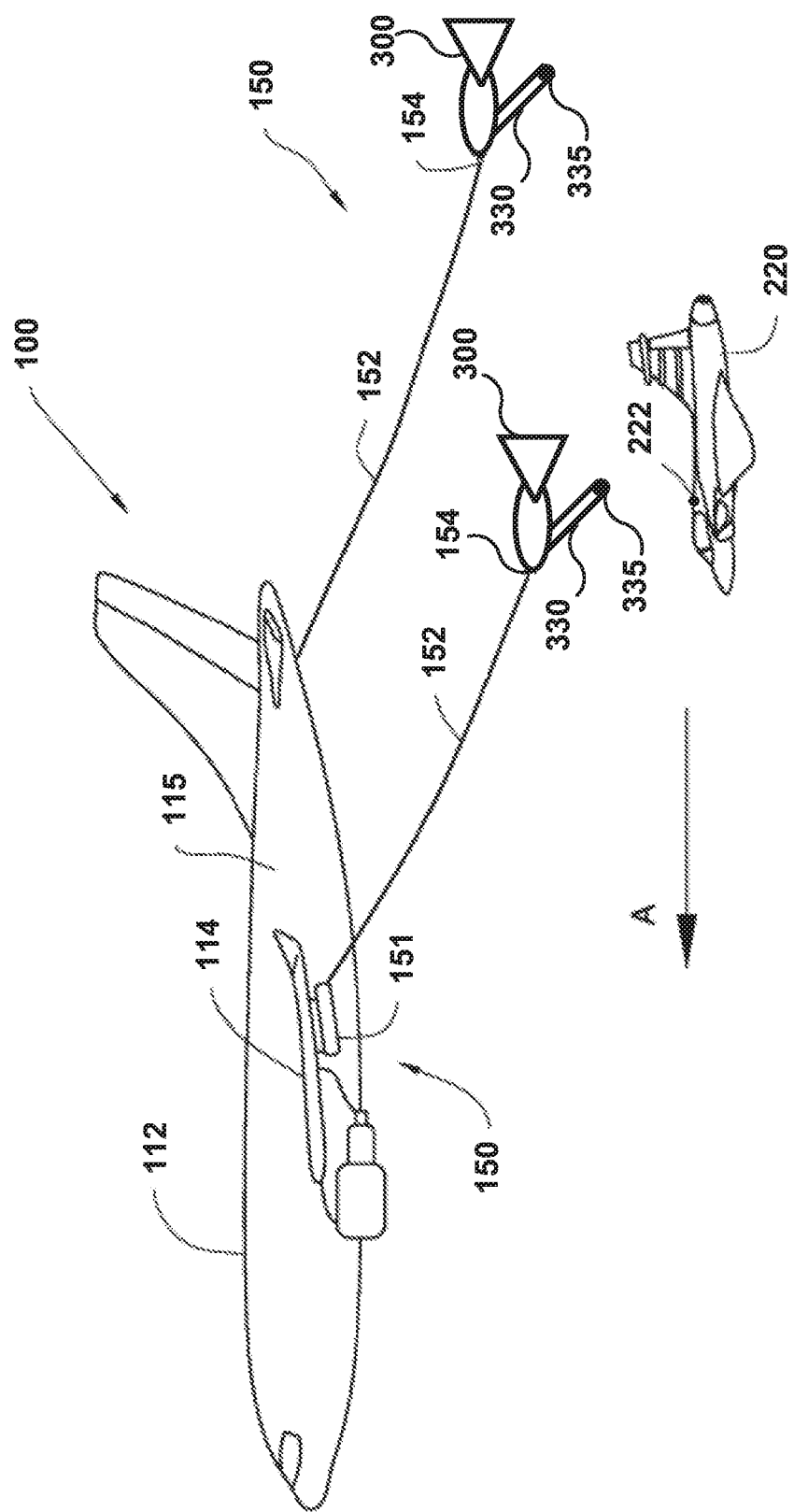

FIGS. 1 and 2 illustrate a tanker system 100 which can include a tanker aircraft 112 with multiple in-flight refueling systems 150, according to one example of the presently disclosed subject matter.

In this example, tanker aircraft 112 has three such in-flight refueling systems 150, one on each one of the port wing 114 and starboard wing 116, and a third one on the rear portion of fuselage 115. Tanker aircraft 112 can be configured for in-flight concurrent refueling of one or more receiver aircraft 220 via a fuel receptacle 222. In some examples, tanker aircraft 112 can have more or less in-flight refueling systems 150, arranged in any suitable configuration with respect to tanker aircraft 112.

By way of non-limiting example, tanker aircraft 112 can be a suitably equipped Boeing 767 and each receiver aircraft 220 can include any one of suitably equipped F-15, or F-16, or B2 stealth bomber, or other suitably equipped fighter, bomber or other aircraft. In some examples, tanker aircraft 112 can be an unmanned aerial vehicle (UAV), and/or, at least one of receiver aircraft 220 can be a UAV.

Each in-flight refueling system 150 can include an elongate, non-rigid, fuel delivery hose 152, reversibly extendible from tanker aircraft 112. A first end (not shown) of hose 152 can be connected to a refueling fuel tank (not shown) carried by tanker aircraft 112. For example, such a refueling fuel tank can be an internal fuel tank of tanker aircraft 112, (e.g., the tanker aircraft's own fuel tanks, a special fuel reservoir mounted internally in tanker aircraft 112, etc.), or, an external fuel tank (e.g., fuel pods, etc.).

Hose 152 can be flexible and can be retracted into a roll up drum (not shown), suitably provided in tanker aircraft 112, and selectively deployed therefrom when required.

The second (aft) end 154 of hose 152 can be operatively connected to a respective refueling device 300 that can be towed in a forward direction A by tanker aircraft 112 via hose 152 when hose 152 is extended and tanker aircraft 112 is in flight. Refueling device 300 includes a boom member 330 and a fuel delivery nozzle 335 in fluid communication with hose 152 (see FIG. 2, for example), which are described in greater detail below with reference to FIG. 3. In some examples, refueling device 300 can be a UAV.

In this example, one in-flight refueling system 150 is centrally-located and mounted with respect to the rear fuselage 115 of tanker aircraft 112, and each of the other two in-flight refueling systems 150 is included in a respective pod 151 that is attached to the underside of the respective wing 114, 116 (see FIG. 2, for example).

Figure 3:
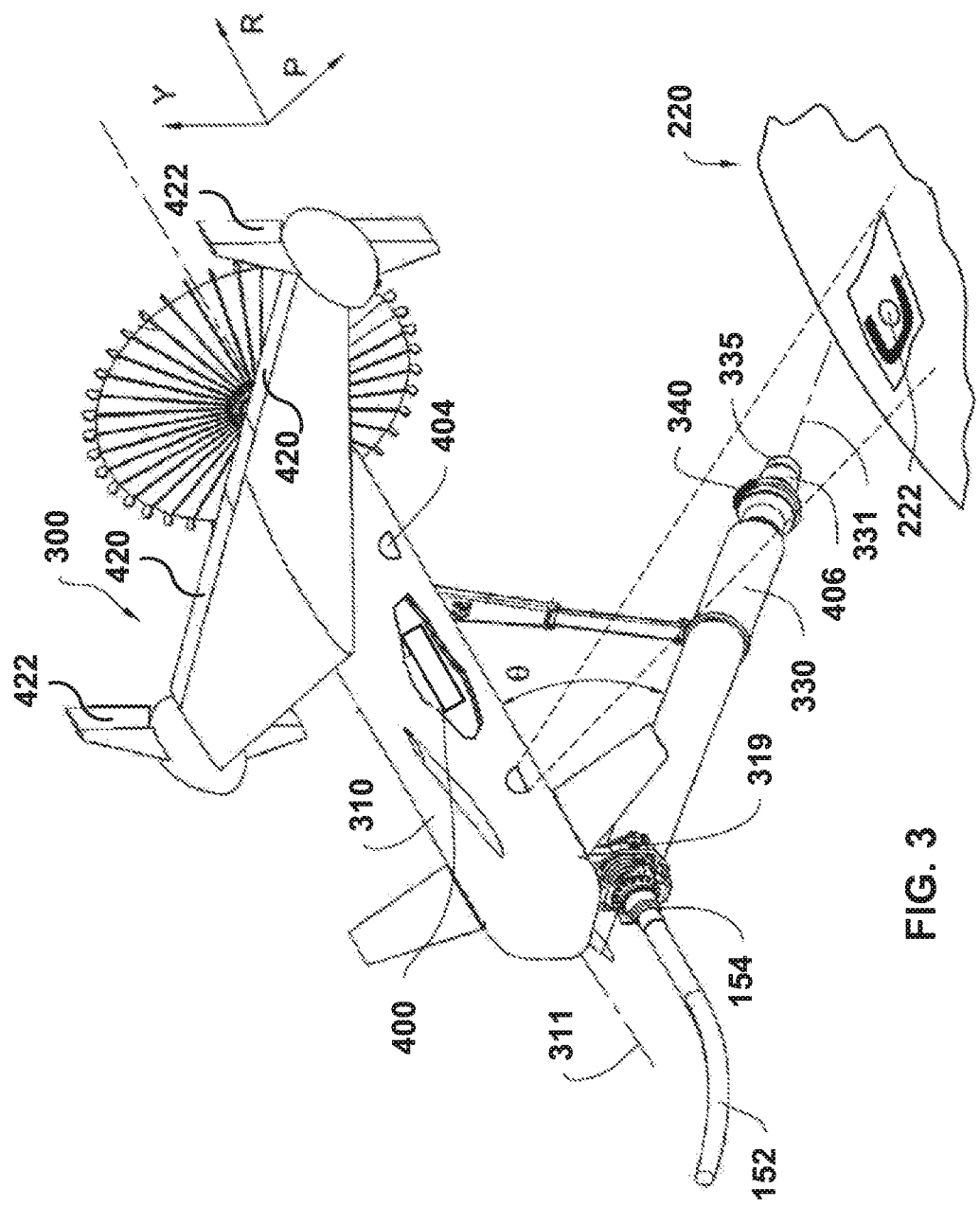
FIG. 3 illustrates a refueling device, in accordance with certain examples of the presently disclosed subject matter.

FIG. 3 illustrates a refueling device 300 for use with an in-flight refueling system, for example at least one of the in-flight refueling systems 150 illustrated in FIGS. 1 and 2, according to an example of the presently disclosed subject matter.

For convenience, roll axis R, pitch axis P, and yaw axis Y can be conventionally defined with respect to refueling device 300. Roll axis R is parallel to or co-axial with a longitudinal axis 311 of refueling device 300. Pitch axis P is generally in lateral and orthogonal relationship to roll axis R (i.e., parallel to the horizontal when the body is at a zero roll angle). Yaw axis Y is in orthogonal relationship to roll axis R and pitch axis P (i.e., parallel to the vertical when the body is at a zero pitch angle).

Refueling device 300 can be affixed to the end 154 of hose 152 and includes body 310. Body 310 can include a boom member 330 in fluid communication with hose 152. Boom member 330 can define a boom axis 331 and can include a fuel delivery nozzle 335 at a terminus of boom member 330.

Nozzle 335 can be configured for reversibly engaging with fuel receptacle 222 of receiver aircraft 220.

Refueling device 300, in particular boom member 330 and nozzle 335, can be sized to allow suitable fuel flow rates for refueling a wide range of receiver aircraft.

Boom member 330 includes a joint 340 on boom axis 331. Joint 340 can be configured for allowing relative movement between body 310 and nozzle 335, especially while nozzle 335 is engaged with fuel receptacle 222. In this example, joint 340 is in the form of a spherical-shaped ball joint, and is configured for allowing relative movement between body 310 and nozzle 335, and by extension receiver aircraft 220 when engaged, in at least one degree of freedom.

In some examples, nozzle 335 being engaged with fuel receptacle 222 can define an engaged state of refueling device 300, whereas nozzle 335 not being engaged with fuel receptacle 222 can define a non-engaged state of refueling device 300. In some examples, refueling device 300 being in an instance of an engaged state or being in an instance of a non-engaged state can be determined based on engagement state data, which is obtained using one or more engagement/disengagement sensor(s) 406, described in greater detail below with reference to FIG. 4.

Boom member 330 can be pivotably mounted to body 310 about a pivot axis generally parallel to pitch axis P of body 310 at pivot joint 319, and reversibly pivotable between a stowed or retracted position and a deployed position. In the stowed or retracted position, boom member 330 can be pivoted about the pivot axis into a position where the terminus is closest to the underside of body 310. In this position, boom axis 331 can be generally parallel to and displaced away from longitudinal axis 311 in a downward direction with respect to body 310. In the deployed position illustrated in FIG. 3, boom member 330 can be variably pivoted about the pivot axis in a downward direction to provide a non-zero angular displacement, angle θ, between boom axis 331 and longitudinal axis 311. In this example, angle θ is in pitch with respect to refueling device 300. Boom member 330 can be in the deployed position, at least, during in-flight refueling operation of refueling device 300.

Refueling device 300 further includes one or more roll elements and one or more yaw elements configured to help control a spatial disposition of refueling device 300 when towed aft of tanker aircraft 112 via hose 152. The terms "roll elements" and "yaw elements" used herein refer to any appropriate device or mechanism for affecting the roll and yaw of the refueling device, respectively. For example, roll elements can be one or more control surfaces, such as ailerons, an air powered roll element, such as an air blower, and/or any other appropriate device or mechanism that is configured to rotate the refueling device about its roll axis. Similarly, for example, yaw elements can be one or more control surfaces, such as rudders, an air powered yaw element, such as an air blower, and/or any other appropriate device or mechanism that is configured to rotate the refueling device about its yaw axis.

In this example, the one or more roll elements and the one or more yaw elements are control surfaces, including ailerons 420 as roll elements and rudders 422 as yaw elements. In this example, ailerons 420 are a selectively controllable aerodynamic set of ailerons 420 that are pivotably mounted to an aileron arm of body 310 at an aft portion thereof. Rudders 422 are a selectively controllable set of aerodynamic rudders 422 that are pivotably mounted to rudder arms of body 310 at an aft portion thereof and orthogonal to ailerons 420.

Ailerons 420 and rudders 422 help enable refueling device 300 to be steered and/or to adopt a desired spatial disposition while being towed at the end 154 of hose 152. In particular, ailerons 420 and rudders 422 can be controlled to affect the roll angle of refueling device 300. Exemplary operation of ailerons 420 and rudders 422 is described in greater detail below with reference to FIGS. 8 and 9.

The term roll angle or bank angle is the angle at which the aircraft is rotated or inclined about its longitudinal axis with respect to the horizontal. For example, when the aircraft performs a roll, or a banked turn to change direction, the roll angle of the aircraft is affected.

Refueling device 300 can further include controller 400, and, one or more refueling device sensor(s) 404, which are described in greater detail below with reference to FIG. 4.

Figure 4:
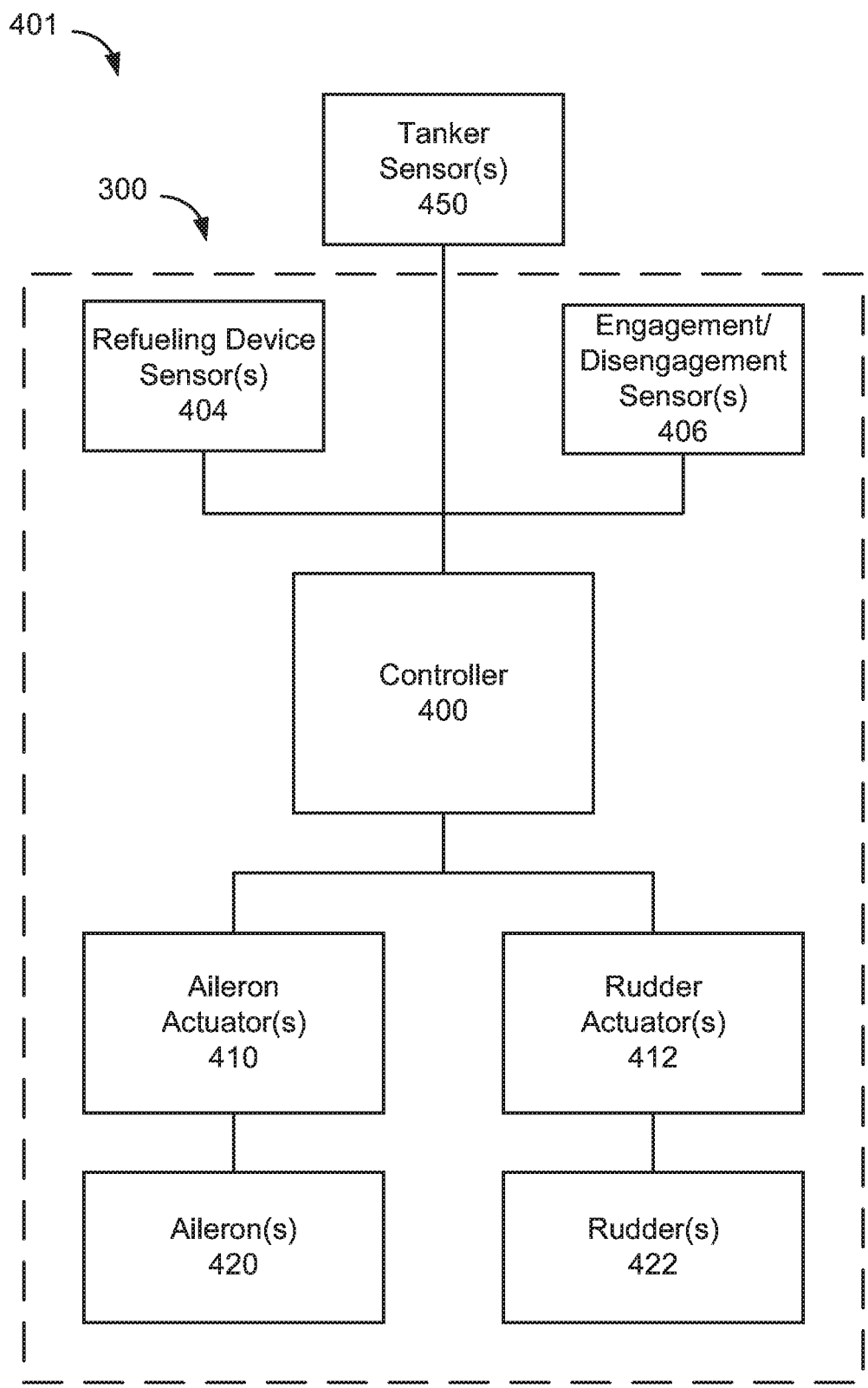
FIG. 4 illustrates a block diagram of a system including a controller for controlling a roll angle of a refueling device, in accordance with certain examples of the presently disclosed subject matter.

FIG. 4 illustrates a block diagram of a system including a controller 400 for controlling the roll angle of refueling device 300 during the in-flight refueling process, in accordance with certain examples of the presently disclosed subject matter.

In this example, controller 400 is part of a system 401 which includes refueling device 300 and one or more tanker sensor(s) 450.

Controller 400 can include processing circuitry (e.g. 500, 600, described below) including one or more memory, and one or more processors configured to execute various operations as disclosed herein. Controller 400 may in some examples include a PID controller or PI controller, a microprocessor, a microcontroller or any other computing device or module or system. One implementation of controller 400 including a PID controller is described in greater detail below with reference to FIG. 6.

Controller 400 can, for example, be implemented as software in a computer processor, as hardware, firmware, or as any combination thereof, executed on a suitable device or devices, that performs the functions as explained herein.

Controller 400 may include a plurality of controllers, possibly in a distributed architecture, which are adapted to independently and/or cooperatively operate to process various data, electrical and/or mechanical inputs (after being converted into electrical or possibly digital form), for controlling the relevant components of system 401, and for enabling operations related to components of system 401. In some cases multiple instances of controller 400, or of a particular component or module within it, may be utilized for reasons of redundancy and availability.

Controller 400 can be operatively connected to one or more refueling device sensor(s) 404, one or more tanker sensor(s) 450, one or more engagement/disengagement sensor(s) 406, one or more aileron actuator(s) 410, and one or more rudder actuator(s) 412.

Controller 400 can be configured to receive data from the various one or more sensor(s) 404, 406, 450. Controller 400 can also be configured to provide commands to actuators 410, 412.

In this example, tanker sensor(s) 450 are located on-board tanker aircraft 112, and are configured to determine a roll angle of tanker aircraft 112. Tanker sensor(s) 450 can also be configured to determine, at least, one or more of the following: a position, speed, and/or acceleration of tanker aircraft 112, etc. Data from tanker sensor(s) 450 can be transmitted wirelessly to controller 400. For example, tanker sensor(s) 450 can include a Micro-Electro-Mechanical Systems (MEMS) sensor (e.g., a MEMS vertical gyroscope, and/or, MEMS rate gyroscope), an accelerometer, a global positioning system (GPS), an inertial navigation system (INS), camera, Light Detection And Ranging (LIDAR) etc.

In this example, refueling device sensor(s) 404 are located on-board body 310 of refueling device 300, and are configured to determine a roll angle of refueling device 300. Refueling device sensor(s) 404 can also be configured to determine, at least, one or more of the following: a position, speed, and/or acceleration of refueling device 300, a roll rate of refueling device 300, etc. For example, refueling device sensor(s) 404 can include a MEMS sensor (e.g., a MEMS vertical gyroscope, and/or, MEMS rate gyroscope), an accelerometer. GPS, INS, camera, LIDAR, etc.

In this example, engagement/disengagement sensor(s) 406 are located on-board body 310 of refueling device 300, and, are configured to determine if refueling device 300 is engaged with receiver aircraft 220. For example, engagement/disengagement sensor(s) 406 can include proximity sensor(s), etc.

In this example, aileron actuator(s) 410 and rudder actuator(s) 412, are located on-board body 310 of refueling device 300. Actuators 410, 412, are operatively connected to ailerons 420 and rudders 422, respectively. Actuators 410, 412, are configured to actuate the operation of ailerons 420, and rudders 422, respectively, and control the angular position of their respective control surfaces 420, 422 about their respective pivot axes.

Controller 400 can be configured to execute several functional modules in accordance with computer-readable instructions implemented on a non-transitory computer-readable storage medium. Such functional modules are referred to hereinafter as included in controller 400, and are described in greater detail below with reference to FIG. 5.

Figure 5:
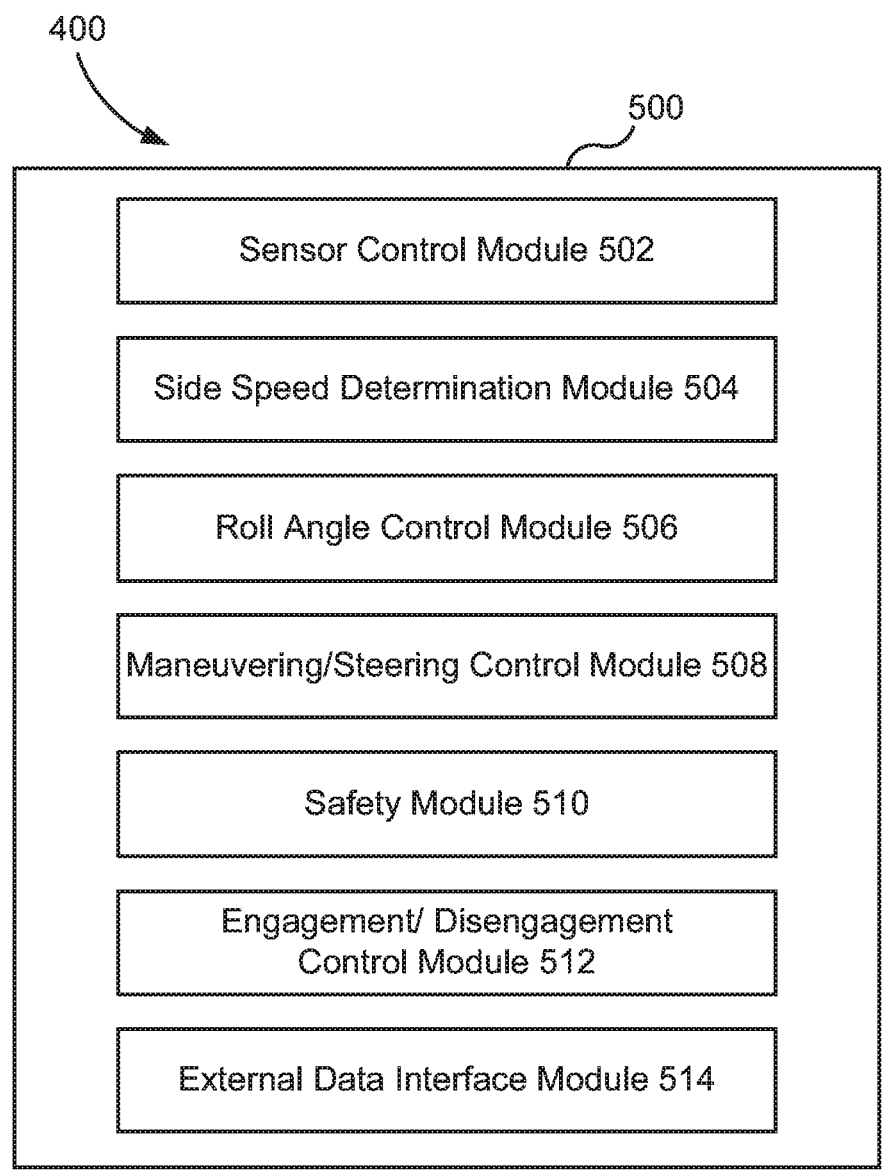
FIG. 5 illustrates functional modules that are part of a controller for controlling a roll angle of a refueling device, in accordance with certain examples of the presently disclosed subject matter.

FIG. 5 illustrates a controller 400 including processing circuitry 500, in accordance with certain examples of the presently disclosed subject matter. In this example, processing circuitry 500 includes functional modules that are part of controller 400 for controlling a roll angle of a refueling device.

In this example, processing circuitry 500 includes sensor control module 502, side speed determination module 504, roll angle control module 506, maneuvering/steering control module 508, safety module 510, engagement/disengagement control module 512, and external data interface module 514.

Sensor control module 502 can be configured to operate one or more sensor(s) 404, 406 in order to acquire data, and enables repeated determination of data, such as the roll angle of refueling device 300, and engagement of refueling device 300 to receiver aircraft 220, respectively.

Side speed determination module 504 can be configured to calculate a relative side speed of the refueling device relative to the tanker aircraft. In some examples, in order to calculate the side speed of the refueling device relative to the tanker aircraft, side speed determination module 504 can perform a differential function on an obtained position of tanker aircraft 112 and a differential function on an obtained position of refueling device 300, and then subtract the results from each other in order to determine the relative side speed. In some examples, in order to calculate the side speed of the refueling device relative to the tanker aircraft, side speed determination module 504 can perform an integral function on an obtained acceleration of tanker aircraft 112 and an integral function on an obtained acceleration of refueling device 300, and then subtract the results from each other in order to determine the relative side speed.

Roll angle control module 506 can be configured to calculate and provide roll control commands to actuators 410, 412, for controlling the roll angle of refueling device 300, e.g., so that is substantially the same as a roll angle of tanker aircraft 112. The roll control commands can be used for controlling ailerons 420, and/or, rudders 422. Exemplary operation of roll angle control module 506 is described in greater detail below with reference to FIG. 7.

Maneuvering/steering control module 508 can be configured to calculate and provide maneuvering/steering commands for maneuvering and steering refueling device 300, e.g., to an engagement area and/or to perform engagement/disengagement. Maneuvering/steering control module 508 can be configured for enabling refueling device 300 to be steered in three degrees of freedom: laterally (left and right), vertically (up and down), and longitudinally (forwards and backwards). Thus, maneuvering/steering control module 508 can be configured for providing one or more of: sideslip, up/down translation, forward-aft translation, relative to tanker aircraft 112, and/or, to receiver aircraft 220.

Safety module 510 can be configured to monitor hazardous situations in the refueling process. The hazardous situations can be defined by a set of thresholds and/or parameters and respective safety conditions. For example, safety module 510 can be configured to monitor that refueling device 300 does not approach receiver aircraft 220 (or vice versa) in an unsafe manner, and/or that refueling device 300 does not approach tanker aircraft 112 (or vice versa) in an unsafe manner, etc.

Engagement/disengagement control module 512 can be configured to provide an engagement command to refueling device 300 for causing refueling device 300 to engage with fuel receptacle 222 of receiver aircraft 220 for performing refueling, and to provide a disengagement command to refueling device 300 to disengage from fuel receptacle 222 of receiver aircraft 220. According to examples of the presently disclosed subject matter, engagement/disengagement control module 512 can operate responsive to an indication that receiver aircraft 220 is positioned in an engagement area. Exemplary operation of engagement/disengagement control module 512 is described in greater detail below with reference to FIGS. 10-13.

External data interface module 514 can be configured to enable one or more components of controller 400 to operate in cooperation with auxiliary units, devices, data stores, systems or modules. For example, external data interface module 514 can implement various protocols, software languages, drive signals, etc. Further, by way of example, external data interface module 514 can be used to operate certain auxiliary units, devices, data stores, systems or modules on board one or more of refueling device 300, receiver aircraft 220, or tanker aircraft 112, such as tanker sensor(s) 450.

Figure 6:
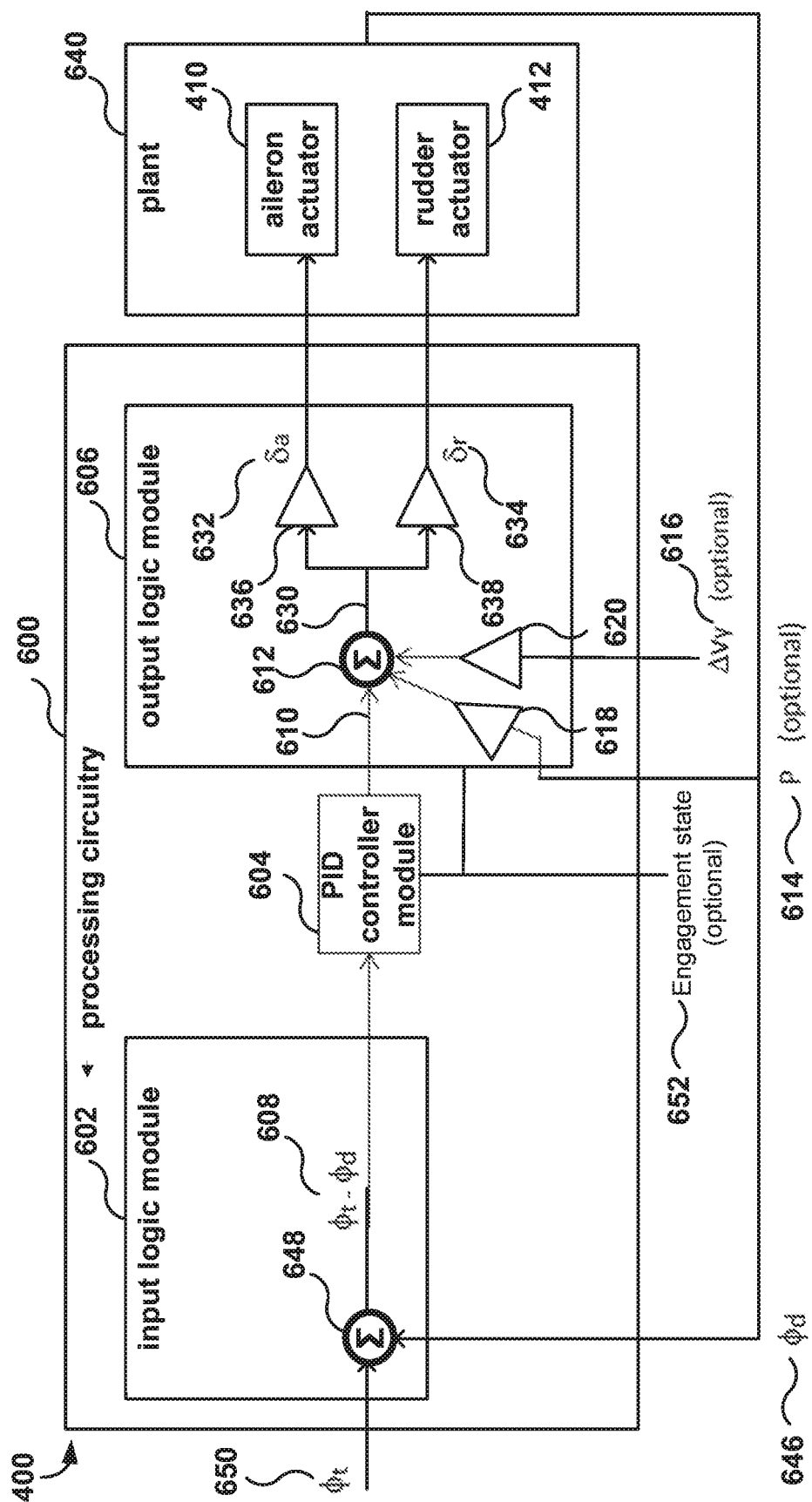
FIG. 6 illustrates an implementation of a controller for controlling a roll angle of a refueling device, in accordance with certain examples of the presently disclosed subject matter.

FIG. 6 illustrates an implementation of controller 400 including processing circuitry 600, in accordance with certain examples of the presently disclosed subject matter.

As mentioned above, controller 400 can be a hardware processor running software. Controller 400 can be hardware implementing at least some of the operations described below with reference to the method of FIG. 7.

In this example, processing circuitry 600 includes an input logic module 602, a PID controller module 604, and an output logic module 606.

Input logic module 602 can include a summing point 648 for calculating a difference between a roll angle of the tanker and a roll angle of the refueling device.

PID controller module 604 can be, or include, a proportional-integral-derivative (PID) controller or a proportional-integral (PI) controller. A proportional-integral controller (PI Controller) is a case of a proportional-integral-derivative controller (PID controller) in which the derivative (D) of the error is not used. The lack of derivative action can make the system more steady in the steady state in the case of noisy data, because derivative action can be more sensitive to higher-frequency terms in the inputs. The output of input logic module 602 can be input to PID controller module 604.

Output logic module 606 can include a summing point 612, and a plurality of gains 618, 620, 636, 638. Output logic module 606 can be configured to generate commands 632, 634 that are used to control operation of one or more ailerons and one or more rudders. The output of PID controller module 604 can be input to output logic module 606 and added to additional weights or gains at summing point 612.

The output of controller 400 can be input to plant/process 640.

For example, when controller 400 is/includes a PI controller, the obtained refueling device roll angle can be the process variable, and the desired roll angle which can be the obtained tanker roll angle can be the setpoint. The roll control commands to the actuators are the manipulated/control variable which is the output from controller 400 and the input to the process or plant 640. The difference between the present roll angle of the refueling device and the setpoint (tanker roll angle) can be the error. By measuring the refueling device roll angle and subtracting it from the setpoint (tanker roll angle), the error can be found. Based on the error, controller 400 calculates how much to adjust the ailerons and/or rudders to affect the refueling device roll angle, i.e., what roll control commands to provide to the ailerons and/or rudders. The feedback of the process or plant can be the obtained updated roll angle of the refueling device, which can then be used to further control the roll angle of the refueling device in an attempt to achieve the desired roll angle, one that is substantially the same as the tanker roll angle.

In this example, proportional action adjusts the ailerons and/or rudders in proportion to the existing error. Integral action can use the accumulated state error, from the past, to detect whether the desired roll angle of the refueling device is settling out and to adjust the ailerons and/or rudders in relation not only to the error but also the time for which it has persisted. In some examples the formulation of integral action can be to adjust the ailerons and/or rudders in small persistent steps that are proportional to the current error. Over time, the steps accumulate and add up, dependent on past errors.

The operation of controller 400 is described in further detail below with reference to FIG. 7.

FIG. 7 illustrates a flow chart of a method 700 for controlling a refueling device during in-flight refueling, in accordance with certain examples of the presently disclosed subject matter.

Method 700 can be performed throughout the refueling process, while refueling device is in a non-engaged state or in an engaged state.

Method 700 includes the preliminary step of obtaining roll control data (block 702) (e.g., determined by the various sensors and obtained by sensor control module 502, and/or, external data interface module 514 of controller 400). Obtaining roll control data (block 702) includes obtaining a roll angle of the tanker aircraft (block 704) (e.g., determined by tanker sensor(s) 450) and obtaining a roll angle of the refueling device (block 706) (e.g., determined by refueling device sensor(s) 404).

Obtaining roll control data (block 702) can also optionally include obtaining a roll rate of the refueling device (block 708) (e.g., determined by refueling device sensor(s) 404), obtaining a side speed of the refueling device relative to the tanker aircraft (block 710) (e.g., calculated by side speed determination module 504), and obtaining engagement state data (block 712) (e.g., determined by engagement/disengagement sensor(s) 406).

Upon obtaining roll control data (block 702) the difference between the roll angle of the tanker aircraft and the roll angle of the refueling device is determined (block 714) (e.g., calculated by roll angle control module 506, and/or, input logic module 602 of controller 400).

Upon determining the difference between the roll angle of the tanker aircraft and the roll angle of the refueling device (block 714) a roll correction command is generated (block 716) (e.g., calculated by roll angle control module 506, and/or, PID controller module 604 of controller 400). The roll correction command can be generated based on the determined difference between the roll angle of the tanker aircraft and the roll angle of the refueling device.

Optionally, upon generating the roll correction command (block 716) the roll correction command can be adjusted (block 718) (e.g., by roll angle control module 506 and/or, output logic module 606 of controller 400). The roll correction command can be adjusted based on the obtained roll rate of the refueling device, the obtained side speed of the refueling device relative to the tanker aircraft, and/or, the engagement state data. In some examples, the roll correction command can be adjusted based on an adjusted roll rate of the refueling device, and/or, an adjusted side speed of the refueling device relative to the tanker aircraft. In some examples, the roll correction command, the roll rate, and/or, the side speed of the refueling device relative to the tanker aircraft can be adjusted by using gains, as described in greater detail below with reference to FIG. 6.

Upon generating/adjusting the roll correction command (block 716/block 718) one or more roll control commands, to be used by the refueling device to attempt to achieve or maintain a roll angle that is substantially the same as the roll angle of the tanker aircraft, are generated (block 720) (e.g., by roll angle control module 506, and/or, output logic module 606 of controller 400). The roll control commands can be generated based on the generated/adjusted roll correction command.

Generating roll control commands for the refueling device (block 720) can include generating one or more aileron control commands for controlling one or more of the refueling device ailerons (block 722), and/or generating one or more rudder control commands for controlling one or more of the refueling device rudders (block 724). Generating an aileron command, and/or a rudder command can be done by splitting, and/or adjusting a roll control command, e.g., using gains as described in greater detail below with reference to FIG. 6.

In some examples it might take more than one iteration of the process for the roll angle of the refueling device to achieve the desired roll angle. In some examples, controller 400 is configured to operate in a continuous manner so that it is constantly using the feedback from the system to attempt to achieve or maintain a desired roll angle (based on a calculated error).

In some examples, certain steps and not others can be performed in iteration. For example, a previously determined roll angle of the tanker aircraft and a newly determined updated roll angle of the refueling device can be used to improve on a previous attempt to reach the previously determined desired roll angle, without determining a new roll angle of the tanker aircraft, i.e., performing one or more iterations of the operations of (block 706), (block 714), and (block 716) based on a previously obtained roll angle of the tanker aircraft, before performing the operation of (block 704) again.

In some examples, a roll angle of the tanker aircraft that was obtained during an engaged state can be used to determine the desired roll angle of the refueling device in a non-engaged state, and vice versa.

An exemplary operation of controller 400 is described, as follows, with reference to FIGS. 6 and 7. It is also noted that whilst the operation of controller 400 is described with reference to operations of control method 700 and elements of system 401, this is by no means binding, and the operation of controller 400 can be performed by using operations and elements other than those described herein.

Referring to FIGS. 6 and 7, a determined difference between a roll angle of the tanker and a roll angle of the refueling device ($\Delta\phi=\phi_t-\phi_d$) 608 can be provided as input to PID controller module 604 (e.g., from input logic module 602).

Although in the description above the difference between the roll angle of the tanker and the roll angle of the refueling device ($\Delta\phi$) is described as being determined (block 714) as a result of obtaining the roll angle of the tanker aircraft (block 704) and obtaining the roll angle of the refueling device (block 706) and calculating the difference, in some examples if the difference between the roll angles ($\Delta\phi$) is determined in another manner, then that difference ($\Delta\phi$) can also be used by controller 400.

The output of PID controller module 604 can be one or more roll correction command(s) 610 for controlling the operation of one or more ailerons 420 and/or one or more rudders 422 of refueling device 300 (e.g., as generated in (block 716)).

In some examples, PID controller module 604 has internal gains (not shown), and the output 610 of PID controller module 604 can be affected by these internal gains.

Optionally, the output 610 of PID controller module 604 can be provided to a summing point 612 (e.g., of output logic module 606) where the determined roll rate of the refueling device (P) 614 (e.g., obtained in (block 708)) and/or the determined side speed of the refueling device relative to the tanker aircraft $\Delta Vy$ 616 (e.g., obtained in (block 710)) are added to the output of PID controller module 604 to adjust the one or more roll correction command(s) 610 and produce one or more adjusted roll correction command(s) 630 (e.g., as adjusted in (block 718)).

Although in the description above the side speed of the refueling device relative to the tanker aircraft $\Delta Vy$ 616 is described as being calculated by side speed determination module 504 (block 710), in some examples if the side speed of the refueling device relative to the tanker aircraft $\Delta Vy$ 616 is obtained or determined in another manner, then that $\Delta Vy$ 616 can also be used by PID controller module 604.

In some examples, the determined roll rate of the refueling device (P) 614, and/or the side speed of the refueling device relative to the tanker aircraft $\Delta Vy$ 616 can be provided to gains 618, 620, respectively, for adjustment, before being provided to summing point 612.

Using the determined roll rate of the refueling device (P) 614, and/or the determined side speed of the refueling device relative to the tanker aircraft $\Delta Vy$ 616, can help prevent or reduce oscillation of the system and help the system to reach a steady state more quickly, and thereby help to achieve or maintain a roll angle of the refueling device that is substantially the same as the roll angle of the tanker aircraft.

The roll correction command(s) 610, or adjusted roll correction command(s) 630, are used to generate one or more roll control command(s), 632, 634 (e.g., as generated in (block 720).

In some examples, roll control commands 632, 634 are generated by splitting the roll correction command(s) 610, or 630, into aileron roll control command(s) $\delta a$ 632 and rudder control command(s) $\delta r$ 634 (e.g., as generated in (block 722) and (block 724)).

In some examples, roll control commands 632, 634 can be the same command for both ailerons 420 and rudders 422. An example of the roll control commands being the same for both is described in greater detail below with reference to FIGS. 8 and 9.

In some examples, gain calibration can be performed using gains 636, 638, to affect roll control commands 632, 634, respectively, and thereby modify the effect that ailerons 420 and/or rudders 422 have when attempting to achieve the desired roll angle. For example, gain calibration can be done to adjust the size of the gains in order to stabilize the system and make the system more robust to disturbances.

In some examples, gain calibration can be performed based on engagement state data 652 (e.g., as obtained in (block 712)) which is indicative of an engagement state of the refueling device, e.g., determined by engagement/disengagement sensor(s) 406.

Gain calibration can affect the value of one or more of gains 618, 620, 636, 638, and/or, the internal gains of PID controller module 604. For example, upon engagement, and/or disengagement, certain gains can be faded in, and/or, faded out, to prevent jumps and disturbances to the system.

In some examples, gain scheduling can be performed. Gain scheduling can affect the value of one or more of gains 618, 620, 636, 638, and/or the internal gains of PID controller module 604 as a result of one or more determined conditions. For example, gain scheduling can depend on one or more of: a determined height of the refueling device, a determined speed of the refueling device, a determined engagement of the refueling device, etc.

In some examples, roll control commands 632, 634 can be provided to both ailerons 420 and rudders 422 seamlessly throughout the refueling process, while refueling device 300 is in both engagement states, i.e., both the non-engaged state and the engaged state. Providing roll control commands 632, 634 to both ailerons 420 and rudders 422 throughout the refueling process can prevent any jumps or disturbances that might occur from switching modes of operation, e.g., which would be done upon engagement or disengagement. Roll control commands 632, 634 can be provided to both ailerons 420 and rudders 422 throughout the process since the effect of ailerons 420 on the roll angle is dominant in the non-engaged state, and the effect of rudders 422 on the roll angle is dominant in the engaged state. An example of the roll control commands being provided to both the ailerons and the rudders seamlessly throughout the refueling process is described in greater detail below with reference to FIGS. 8 and 9.

In some examples, a switch (not shown) can be provided for switching between modes of operation, depending upon engagement of the refueling device. In such examples, the switch can be operated based on obtained engagement state data 652, e.g., determined by engagement/disengagement sensor(s) 406. For example, in an engaged state, only rudder roll control command(s) 634 are provided to rudders 422, and, roll control commands are not provided to ailerons 420. In a non-engaged state, only aileron roll control commands 632 are provided to ailerons 420, and roll control commands are not provided to rudders 422.

In some examples, aileron roll control command(s) 632 can be provided to aileron actuator(s) 410 and rudder roll control command(s) 634 can be provided to rudder actuator(s) 412.

In some examples, aileron actuator(s) 410 and rudder actuator(s) 412 are part of plant 640.

Plant 640 may refer to the characteristics and dynamics of all of, or some of, the particular refueling device, actuators, ailerons, rudders, etc. The dynamics of these particular systems may drive how plant 640 behaves and responds to the command(s). As the ailerons 420 and/or rudders 422 that are attached to refueling device 300 are adjusted, this can affect the roll angle of refueling device 300 relative to the roll angle of tanker aircraft 112. The result of plant 640 may be a movement of refueling device 300, thereby affecting the roll angle of refueling device 300 relative to the roll angle of tanker aircraft 112, and thus a changed value of the difference between the tanker roll angle and the refueling device roll angle.

Gain coefficients for controller 400 may be determined and tuned for each "plant", e.g. for each particular combination of types of refueling devices, hoses, tanker aircraft and receiver aircraft, or their components (e.g., rudders and ailerons). In some embodiments, the coefficient values for each combination of systems may be stored in a data store, and relevant values can be provided and used, depending on the different refueling situations.

The feedback from plant 640 can include an obtained refueling device roll angle $\phi_d$ 646. Refueling device roll angle $\phi_d$ 646 can be provided to input logic module 602, e.g. summing point 648. An obtained tanker roll angle $\phi_t$ 650 can also be provided to input logic module 602, e.g. summing point 648, and, the result can be the determined difference between the roll angle of the tanker and the roll angle of the refueling device $\Delta\phi$ 608, which can be provided as input to PID controller module 604.

The feedback from plant 640 can also optionally include a determined roll rate of the refueling device (P) 614, which can be provided to output logic module 606, e.g., summing point 612, as described above.

Figure 8:
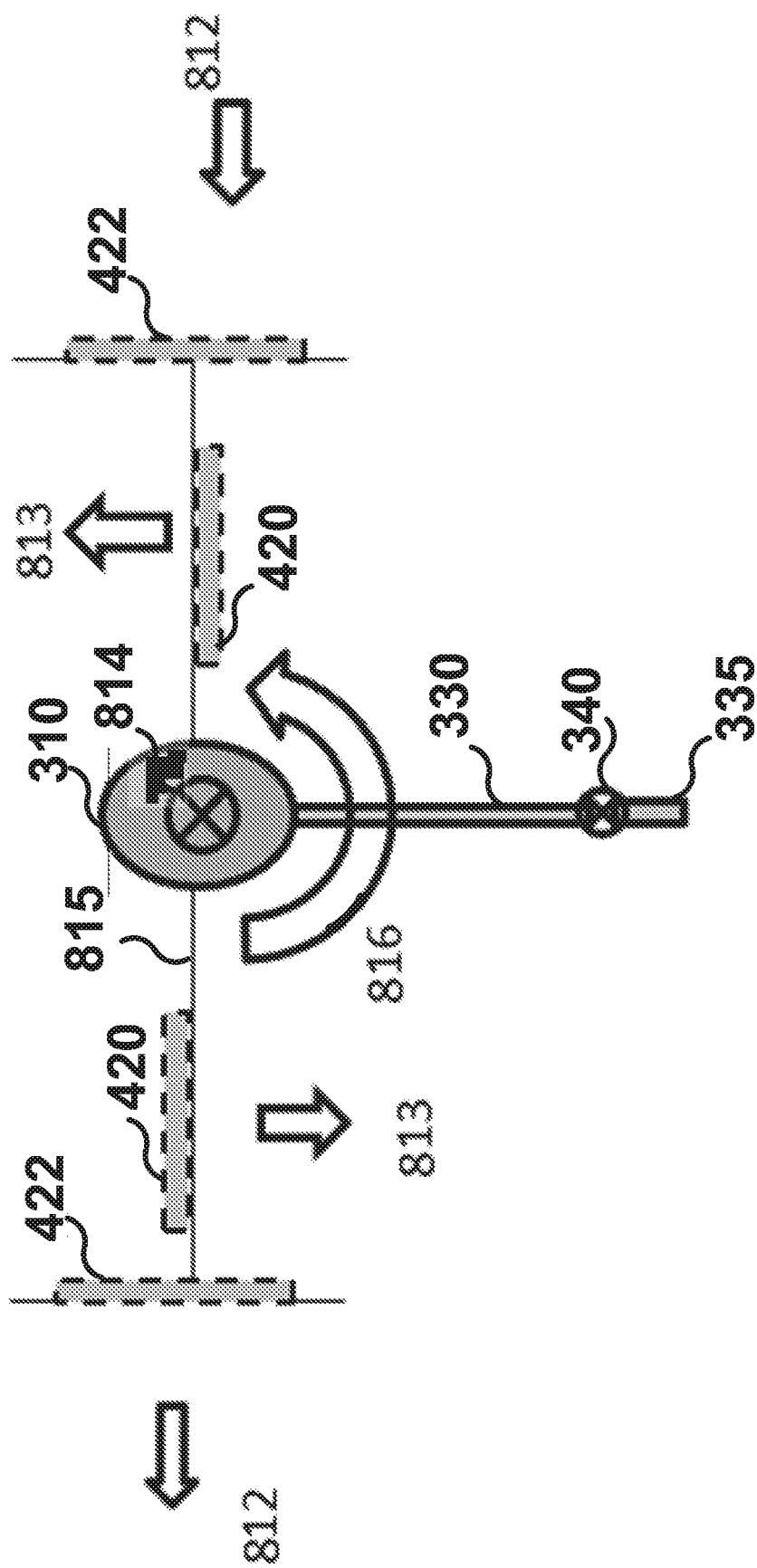
FIGS. 8 and 9 illustrate some of the forces that are present during various stages of the refueling process, in accordance with certain examples of the presently disclosed subject matter.
Figure 9:
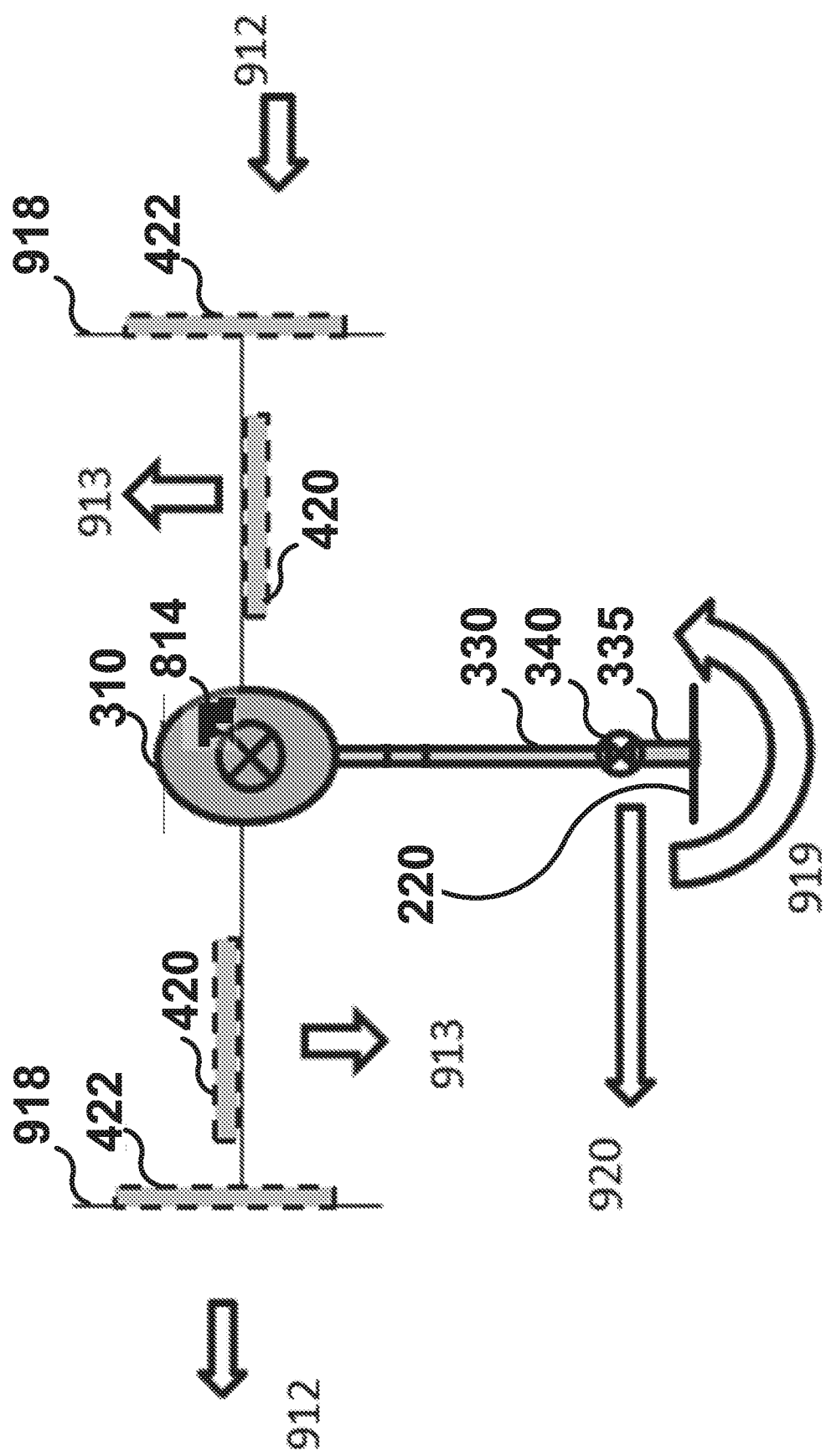

FIGS. 8 and 9 illustrate some of the forces that are present during various stages of the refueling process, in accordance with certain examples of the presently disclosed subject matter.

In FIG. 8, refueling device 300 is in a non-engaged state and roll control commands 632, 634 are used to control ailerons 420 and rudders 422. Using aileron roll control command(s) 632 to actuate ailerons 420 generates aileron forces 813. As a result, aileron forces 813 together with aileron arm 815 generate free state rolling movement 816 about free state roll pivot point 814, which affects the roll angle of refueling device 300. In this case, even if rudder roll control command(s) 634 are provided to actuate rudders 422 and generate rudder forces 812, since refueling device 300 is in a non-engaged state and is free to rotate about pivot point 814 (since nozzle 335 is not constrained), rudder forces 812 are relatively insignificant in comparison to aileron forces 813 for affecting the rolling movement of refueling device 300, i.e., the refueling device roll angle.

In FIG. 9, refueling device 300 is in an engaged state and roll control commands 632, 634 are used to control rudders 422 and ailerons 420. Using rudder roll control command(s) 634 to actuate rudders 422 generates rudder forces 912. As a result, rudder forces 912 together with boom member 330 generate engaged state rolling movement 919 about joint 340, which acts as an engaged state roll pivot point. In this case, even if aileron roll control command(s) 632 are provided to actuate ailerons 420 and generate aileron forces 913, since refueling device 300 is in an engaged state and is not free to rotate about pivot point 814 (since nozzle 335 is constrained), aileron forces 913 are relatively insignificant in comparison to rudder forces 912 for affecting the rolling movement of refueling device 300, i.e., the refueling device roll angle. When refueling device 300 is in an engaged state, the constraint on nozzle 335 causes engaged state constraint side force 920. Engaged state constraint side force 920 together with boom member 330 neutralize rolling movement 816 about pivot 814 that occurs when refueling device 300 is in a disengaged state (see FIG. 8, for example).

Providing roll control commands 632, 634 to both ailerons 420 and rudders 422 seamlessly throughout the refueling process without switching can reduce the complexity of control needed to achieve some of the goals during the refueling process. Some of these goals are described in greater below with reference to FIGS. 10 to 13.

FIGS. 10 to 13 illustrate a refueling device 300 during various stages of the refueling process, in accordance with certain examples of the presently disclosed subject matter.

Figure 10:
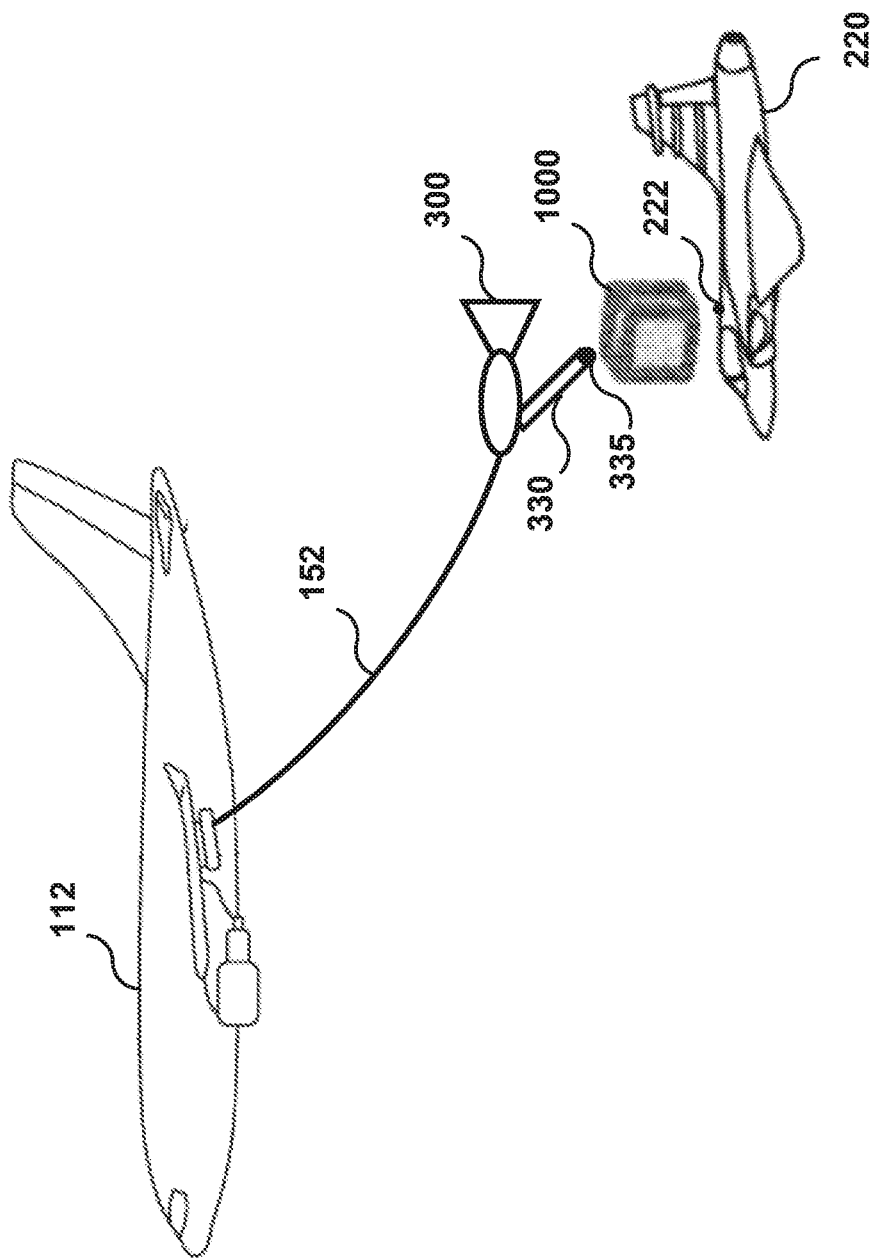
FIGS. 10 to 13 illustrate a refueling device during various stages of the refueling process, in accordance with certain examples of the presently disclosed subject matter.

FIG. 10 illustrates refueling device 300 in a non-engaged state before it has reached engagement area 1000. In this example, the goals are for refueling device 300 and receiver aircraft to be in their respective proper positions in engagement area 1000 to enable engagement between nozzle 335 and fuel receptacle 222, and to then perform a safe refueling and disengagement. In order to facilitate these goals, controller 400 will attempt to maintain a roll angle of refueling device 300 that is substantially the same as tanker aircraft 112 throughout the process.

For example, maintaining the desired roll angle can be facilitated by roll angle control module 506 of controller 400.

Figure 11:
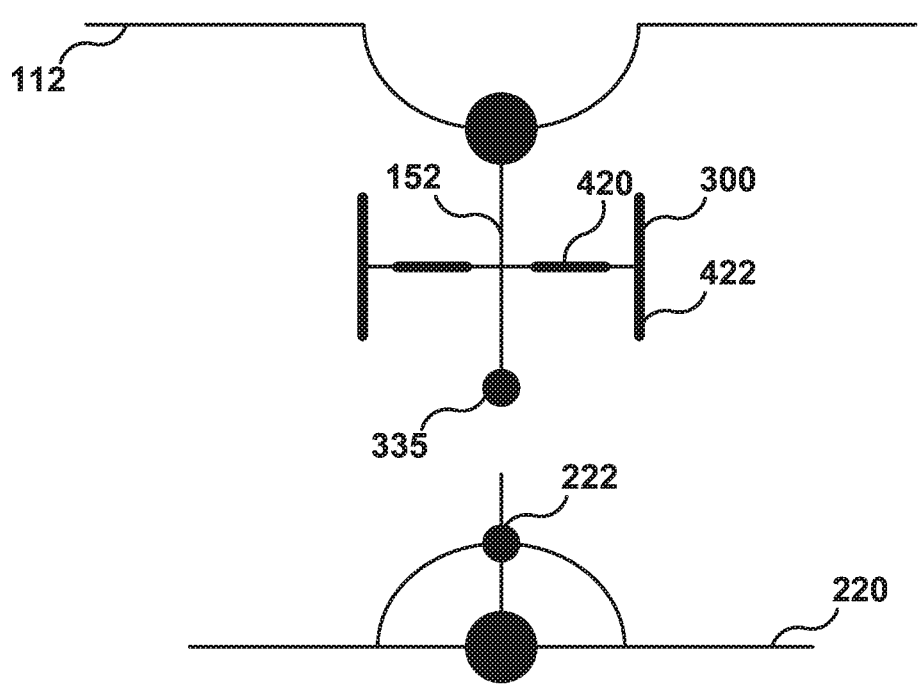
Figure 12:
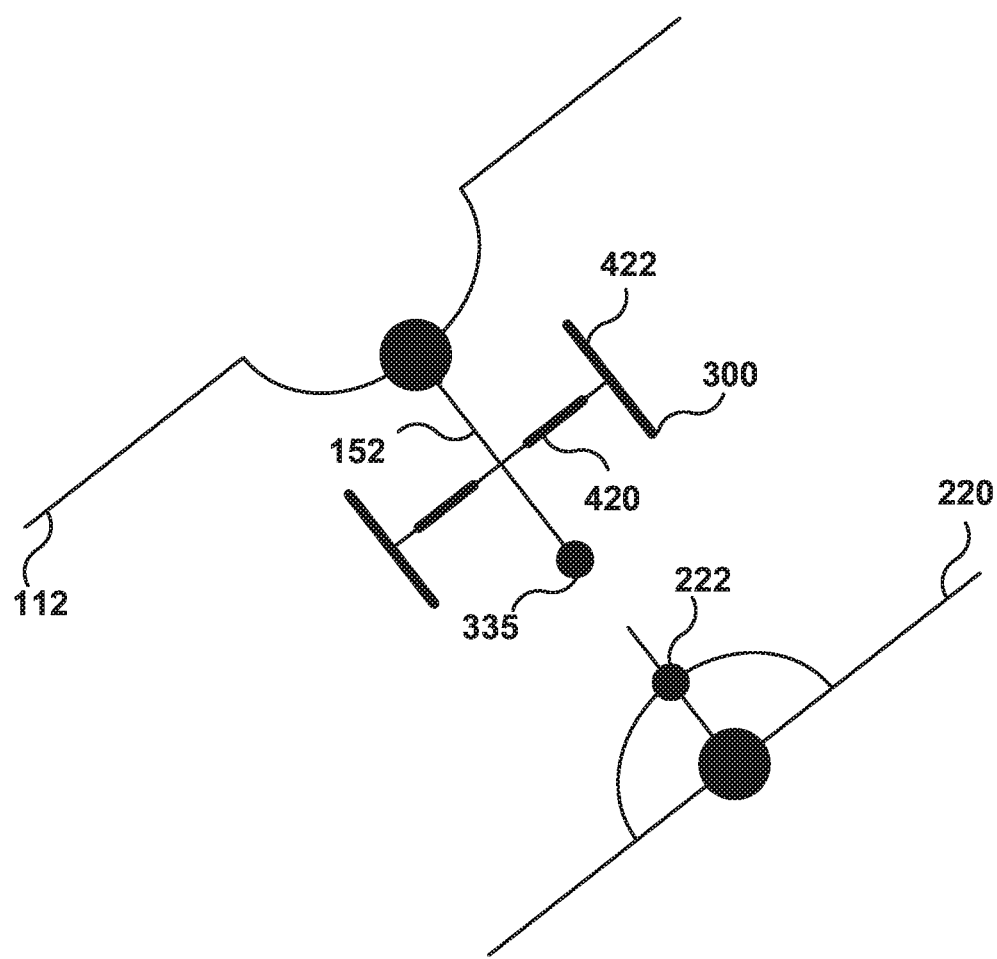

FIG. 11 illustrates refueling device 300 in parallel alignment with tanker aircraft 112 and receiver aircraft 220, with all three being in parallel alignment with the horizon of the Earth. FIG. 12 illustrates refueling device 300 in parallel alignment with tanker aircraft 112 and receiver aircraft 220, with all three being in rotation relative to the horizon of the Earth. Maintaining a roll angle of refueling device 300 that is substantially the same as the roll angle of tanker aircraft 112 allows the parallel alignment shown in FIG. 11 to be maintained despite the turning of tanker aircraft 112. Maintaining this parallel alignment throughout the leadup to the engagement allows the position of nozzle 335 to be adjusted relative to fuel receptacle 222 without having to rotate nozzle 335 relative to the position of fuel receptacle 222. This can simplify the process of aligning and engaging nozzle 335 to fuel receptacle 222, and prevent potential danger to the pilot of receiver aircraft 220, thereby facilitating the above-stated goals.

For example, the aligning of nozzle 335 with fuel receptacle 222 can be facilitated by maneuvering/steering control module 508 of controller 400.

When boom member 330 and nozzle 335 are in a predetermined spatial disposition with respect to fuel receptacle 222 (i.e., at the engagement area 1000 of FIG. 10), engagement between nozzle 335 and fuel receptacle 222 can be performed to enable the refueling of receiver aircraft 220. For example, refueling device 300 can be moved towards receiver aircraft 220 to effect engagement between nozzle 335 and fuel receptacle 222.

For example, the engagement can be facilitated by engagement/disengagement control module 512 of controller 400.

Figure 13:
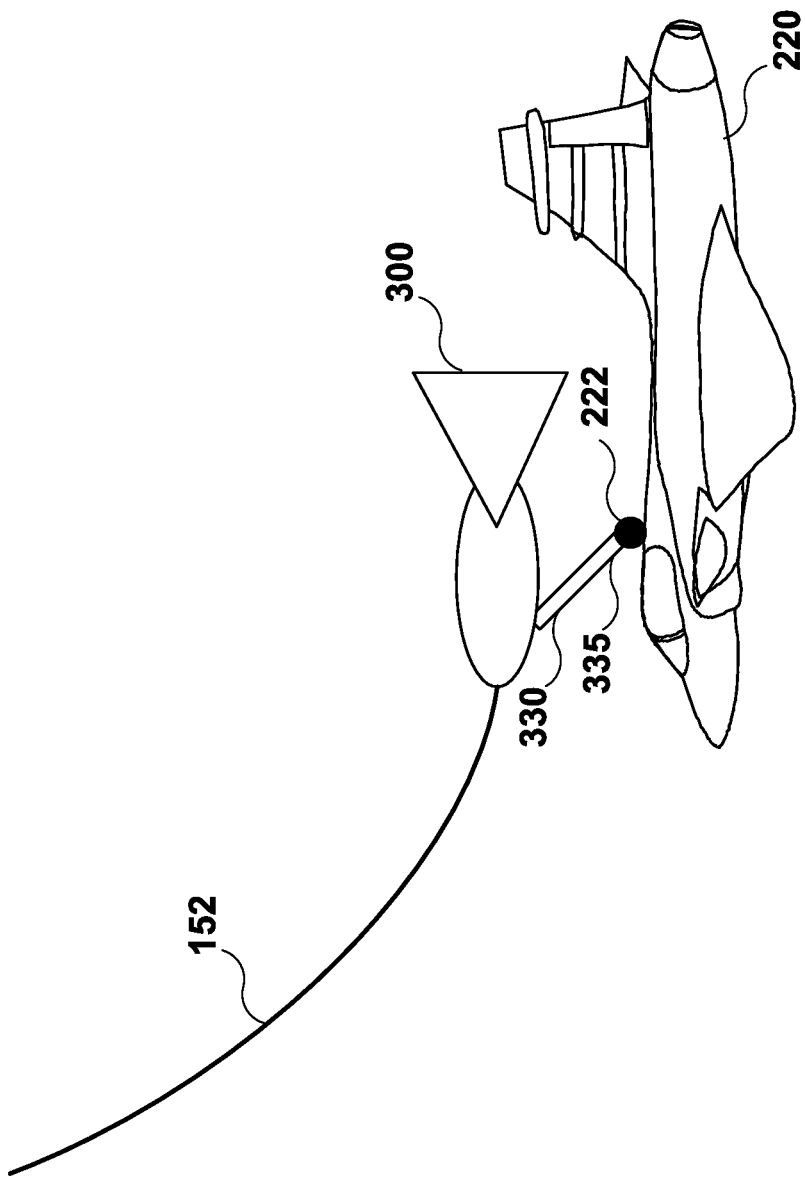

FIG. 13 illustrates refueling device 300 in an engaged state. Once nozzle 335 is engaged with fuel receptacle 222 of receiver aircraft 220, tanker aircraft 112 can begin refueling receiver aircraft 220. Maintaining a roll angle of refueling device 300 that is substantially the same as the roll angle of tanker aircraft 112 during refueling prevents potential danger to the pilot of receiver aircraft 220, thereby facilitating the above-stated goals.

As mentioned above, maintaining the desired roll angle can be facilitated by roll angle control module 506 of controller 400.

After engagement and refueling, refueling device 300 can be disengaged and used for refueling another receiver aircraft 220, or, retracted to tanker aircraft 112.

For example, disengagement can be facilitated by engagement/disengagement control module 512 of controller 400.

In some examples, throughout the refueling process safety module 510 can monitor that refueling device 300 does not approach either aircraft 112, 220 in an unsafe manner (or vice versa).

Although in the description above controller 400 was described as maintaining the roll angle of refueling device 300 as substantially the same as tanker aircraft 112, in some examples controller 400 can be configured to determine a roll angle of receiver aircraft 220 and maintain the roll angle of refueling device 300 as substantially the same as receiver aircraft 220 when refueling device 300 is in an engaged state. For example, in FIG. 7 in place of, or, in addition to, obtaining a roll angle of tanker aircraft 112 (block 704) a roll angle of receiver aircraft 220 can be obtained (e.g. determined by a sensor on-board the receiver aircraft and obtained by external data interface module 514 of controller 400) and used to determine a desired roll angle of refueling device 300 (e.g., determined by roll angle control module 506 of controller 400).

It is to be understood that the invention is not limited in its application to the details set forth in the description contained herein or illustrated in the drawings. The invention is capable of other examples and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the examples of the invention as hereinbefore described without departing from its scope, defined in and by the appended claims.

The invention claimed is:

1. A computerized method of controlling a refueling device, the method comprising:
    (a) providing the refueling device that is attached by means of a non-rigid hose to a tanker aircraft; the refueling device having a refueling device body connected to a refueling nozzle by a joint, the joint facilitating at least a degree of freedom of the refueling device body relative to the refueling nozzle when the refueling nozzle is engaged with a receptacle of a receiver aircraft, constituting an engaged state;
    (b) repeatedly performing by a controller:
    in an instance which the refueling device is not engaged with the receiver aircraft, constituting a non-engaged state:
        (b1) receiving a first roll angle of the tanker aircraft from the tanker aircraft;
        (b2) determining a first desired roll angle of the refueling device based on the first roll angle of the tanker aircraft; and
        (b3) providing a first one or more commands related to the first desired roll angle of the refueling device for controlling one or more roll elements of the refueling device thereby attempting to achieve or maintain a first roll angle of the refueling device that is substantially the same as the first roll angle of the tanker aircraft; and
    in an instance which the refueling device is engaged with the receiver aircraft in said engaged state:
        (b4) receiving a second roll angle of the tanker aircraft from the tanker aircraft;
        (b5) determining a second desired roll angle of the refueling device based on the second roll angle of the tanker aircraft; and
        (b6) providing a second one or more commands related to the second desired roll angle of the refueling device for controlling one or more yaw elements of the refueling device thereby attempting to achieve or maintain a second roll angle of the refueling device that is substantially the same as the second roll angle of the tanker aircraft; wherein the second roll angle of the refueling device during the engaged state is facilitated at least due to the degree of freedom between the refueling device body and the refueling nozzle.

2. The computerized method of claim 1, wherein said stage (b3) is further comprising:
    providing a first one or more commands related to the first desired roll angle of the refueling device for controlling said one or more yaw elements of the refueling device; and
    wherein said stage (b6) is further comprising:
    providing a second one or more commands related to the second desired roll angle of the refueling device for controlling said one or more roll elements of the refueling device;
    thereby providing one or more commands to both the one or more roll elements and the one or more yaw elements seamlessly, irrespective of whether said refueling device is in said non-engaged state or said engaged state.

3. The computerized method of claim 1, further comprising performing gain calibration to affect the first one or more commands and/or the second one or more commands provided to the one or more roll elements and/or the one or more yaw elements and thereby modify the effect that the one or more roll elements and/or the one or more yaw elements has when attempting to achieve the first and/or second desired roll angle.

4. The computerized method of claim 1, wherein said stage (b2) is further comprising:
   receiving a first roll angle of the refueling device and determining a first difference between the first desired roll angle and the first roll angle of the refueling device and utilizing said first difference for providing said first one or more commands; and
   wherein said stage (b5) is further comprising:
   receiving a second roll angle of the refueling device and determining a second difference between the second desired roll angle and the second roll angle of the refueling device and utilizing said second difference for providing said second one or more commands.

5. The computerized method of claim 1, further comprising controlling the one or more roll elements and/or the one or more yaw elements based on the first and/or second one or more commands to attempt to achieve or maintain a roll angle of the refueling device that is substantially the same as the roll angle of the tanker aircraft.

6. The computerized method of claim 1, wherein said stage (b2) and/or said stage (b5) is further comprising:
   obtaining a relative position of the tanker aircraft and the refueling device;
   obtaining a speed of the tanker aircraft; and
   determining a side speed of the refueling device relative to the tanker based on the relative position of the tanker aircraft and the refueling device and the speed of the tanker aircraft; wherein the side speed of the refueling device relative to the tanker is used to prevent or reduce oscillation of the refueling device and thereby help to achieve or maintain a roll angle of the refueling device that is substantially the same as the roll angle of the tanker aircraft.

7. The computerized method of claim 1, wherein said stage (b2) and/or said stage (b5) is further comprising obtaining a roll rate of the refueling device; wherein the roll rate is used to prevent or reduce oscillation of the refueling device and thereby help to achieve or maintain a roll angle of the refueling device that is substantially the same as the roll angle of the tanker aircraft.

8. The computerized method of claim 1, wherein the refueling device is an unmanned aerial vehicle (UAV).

9. A non-transitory program storage device readable by machine, tangibly embodying a program of instructions executable by the machine to perform the method of controlling a refueling device according to claim 1.

10. An inflight refueling system, comprising:
   a refueling device that is attached by means of a non-rigid hose to a tanker aircraft; the refueling device having a refueling device body connected to a refueling nozzle by a joint, the joint facilitating at least a degree of freedom of the refueling device body relative to the refueling nozzle when the refueling nozzle is engaged with a receptacle of a receiver aircraft, constituting an engaged state;
   a sensor configured to determine a roll angle of the tanker aircraft; and
   a controller configured to repeatedly perform the following:
      when the refueling device is not engaged with the receiver aircraft, constituting a non-engaged state:
         (1) receive a first roll angle of the tanker aircraft from the tanker aircraft;
         (2) determine a first desired roll angle of the refueling device based on the first roll angle of the tanker aircraft; and
         (3) provide a first one or more commands related to the first desired roll angle of the refueling device to control one or more roll elements of the refueling device to thereby attempt to achieve or maintain a first roll angle of the refueling device that is substantially the same as the first roll angle of the tanker aircraft; and
      when the refueling device is engaged with the receiver aircraft in said engaged state:
         (4) receive a second roll angle of the tanker aircraft from the tanker aircraft;
         (5) determine a second desired roll angle of the refueling device based on the second roll angle of the tanker aircraft; and
         (6) provide a second one or more commands related to the second desired roll angle of the refueling device to control one or more yaw elements of the refueling device to thereby attempt to achieve or maintain a second roll angle of the refueling device that is substantially the same as the second roll angle of the tanker aircraft; wherein the second roll angle of the refueling device during the engaged state is facilitated at least due to the degree of freedom between the refueling device body and the refueling nozzle.

11. The inflight refueling system of claim 10, wherein the controller is further configured to:
   when the refueling device is in said non-engaged state:
      provide a first one or more commands related to the first desired roll angle of the refueling device to control said one or more yaw elements of the refueling device; and
   when the refueling device is in said engaged state:
      provide a second one or more commands related to the second desired roll angle of the refueling device to control said one or more roll elements of the refueling device;
   wherein one or more commands are thereby provided to both the one or more roll elements and the one or more yaw elements seamlessly, irrespective of whether said refueling device is in said non-engaged state or said engaged state.

12. The inflight refueling system of claim 10, wherein the controller is further configured to perform gain calibration to affect the first one or more commands and/or the second one or more commands to the one or more roll elements and/or the one or more yaw elements and thereby modify the effect that the one or more roll elements and/or the one or more yaw elements has when attempting to achieve the first and/or second desired roll angle.

13. The inflight refueling system of claim 10, further comprising:
   a sensor configured to determine a roll angle of the refueling device; and
   wherein the controller is further configured to obtain the determined roll angle of the refueling device and to:
      when the refueling device is in said non-engaged state:
         determine a first difference between the first desired roll angle and the obtained roll angle of the refueling device and utilize said determined first difference for providing said first one or more commands; and
      when the refueling device is in said engaged state:
         determine a second difference between the second desired roll angle and the obtained roll angle of the refueling device and utilize said determined second difference for providing said second one or more commands.

14. The system of claim 10, further comprising a steering control module configured to control the one or more roll elements and the one or more yaw elements based on the first and/or second one or more commands to achieve or maintain a roll angle of the refueling device that is substantially the same as the roll angle of the tanker aircraft.

15. The inflight refueling system of claim 10, further comprising:
   a speed sensor configured to determine a speed of the tanker aircraft; and
   wherein the controller is further configured to:
      obtain a relative position of the tanker aircraft and the refueling device;
      obtain the speed of the tanker aircraft; and
      determine a side speed of the refueling device relative to the tanker based on the relative position of the tanker aircraft and the refueling device and the speed of the tanker aircraft; wherein the side speed of the refueling device relative to the tanker is used to prevent or reduce oscillation of the refueling device and thereby help to achieve or maintain a roll angle of the refueling device that is substantially the same as the roll angle of the tanker aircraft.

16. The inflight refueling system of claim 10, further comprising a roll rate sensor configured to determine a roll rate of the refueling device; wherein the roll rate is used to prevent or reduce oscillation of the refueling device and thereby help to achieve or maintain a roll angle of the refueling device that is substantially the same as the roll angle of the tanker aircraft.

17. The inflight refueling system of claim 10, wherein the refueling device is an unmanned aerial vehicle (UAV).

18. The inflight refueling system of claim 10, wherein the tanker aircraft is a UAV.

19. The inflight refueling system of claim 10, wherein the receiver aircraft is a UAV.

20. The inflight refueling system of claim 10, wherein the joint is a spherical shaped joint.

21. The inflight refueling system of claim 10, wherein the controller is a Proportional Integral (PI) controller.

22. The inflight refueling system of claim 10, wherein the one or more roll elements are one or more ailerons.

\* \* \* \* \*